(12) United States Patent
Huang et al.

(10) Patent No.: US 12,356,394 B2
(45) Date of Patent: Jul. 8, 2025

(54) COMMUNICATION METHOD AND APPARATUS FOR DETERMINING INFORMATION OF SUB-BAND IN FREQUENCY-DOMAIN RESOURCE

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 392 days.

(21) Appl. No.: 17/788,977

(22) PCT Filed: Nov. 16, 2020

(86) PCT No.: PCT/CN2020/129126
§ 371 (c)(1),
(2) Date: Jun. 24, 2022

(87) PCT Pub. No.: WO2021/129229
PCT Pub. Date: Jul. 1, 2021

(65) Prior Publication Data
US 2023/0040024 A1 Feb. 9, 2023

(30) Foreign Application Priority Data
Dec. 26, 2019 (CN) .......................... 201911371385.1

(51) Int. Cl.
*H04W 72/1268* (2023.01)
*H04B 7/06* (2006.01)
*H04L 5/00* (2006.01)

(52) U.S. Cl.
CPC ...... *H04W 72/1268* (2013.01); *H04B 7/0639* (2013.01); *H04L 5/0051* (2013.01)

(58) Field of Classification Search
CPC .......................... H04W 72/1268; H04B 7/0639
See application file for complete search history.

(56) References Cited

U.S. PATENT DOCUMENTS

2011/0085457 A1 4/2011 Chen et al.
2012/0076023 A1 3/2012 Ko et al.
(Continued)

FOREIGN PATENT DOCUMENTS

| CN | 102388665 A | 3/2012 |
|---|---|---|
| CN | 104094661 A | 10/2014 |

(Continued)

OTHER PUBLICATIONS

Intel Corporation, On Non-Codebook Based UL Transmission, R1-1802392, 3GPP TSG RAN WG1 Meeting #92, Feb. 17, 2018.
(Continued)

*Primary Examiner* — Jackie Zuniga Abad
(74) *Attorney, Agent, or Firm* — Meunier Carlin & Curfman LLC

(57) ABSTRACT

Embodiments of the present invention provide a communication method and apparatus, for use in improving the transmission performance of an uplink signal. The communication method provided in the embodiments of the present invention comprises: determining information of at least one sub-band in a frequency-domain resource according to a transmission parameter for uplink signal transmission and/or parameter information of the frequency-domain resource. By means of the method, a terminal or a network device can determine the information of the sub-band. Therefore, frequency selective precoding transmission can be performed by using the determined sub-band information, thereby achieving the purpose of improving the transmission performance of the uplink signal.

20 Claims, 4 Drawing Sheets

(56) References Cited

U.S. PATENT DOCUMENTS

| | | | |
|---|---|---|---|
| 2014/0355540 A1 | 12/2014 | Accongiagioco et al. | |
| 2018/0213534 A1 | 7/2018 | Liu et al. | |
| 2019/0074884 A1 | 3/2019 | Chen et al. | |
| 2019/0174527 A1 | 6/2019 | Park et al. | |
| 2019/0200380 A1* | 6/2019 | Park | H04L 5/0046 |
| 2019/0289592 A1 | 9/2019 | Lee et al. | |
| 2019/0327115 A1* | 10/2019 | Zhang | H04W 72/23 |
| 2020/0059951 A1 | 2/2020 | Frenne et al. | |
| 2021/0160913 A1 | 5/2021 | Jiang et al. | |
| 2021/0321392 A1* | 10/2021 | Hooli | H04L 5/0053 |
| 2022/0345266 A1* | 10/2022 | Zheng | H04L 5/001 |

FOREIGN PATENT DOCUMENTS

| | | | |
|---|---|---|---|
| CN | 107181514 A | 9/2017 | |
| CN | 108668368 A | 10/2018 | |
| CN | 110463127 A | 11/2019 | |
| CN | 110476365 A | 11/2019 | |
| CN | 110545168 A | 12/2019 | |
| WO | 2018132781 A1 | 7/2018 | |
| WO | 2019108048 A1 | 6/2019 | |
| WO | 2019139915 A1 | 7/2019 | |
| WO | 2019146986 A1 | 8/2019 | |
| WO | 2019170146 A1 | 9/2019 | |
| WO | 2019182429 A1 | 9/2019 | |

OTHER PUBLICATIONS

Samsung, Summary of email Discussion for Rel. 17 enhancements on MIMO for NR, RP-192435, 3GPP TSG RAN Meeting #86, Dec. 4, 2019.

Interdigital Inc., "On TRI and TPMI indication for CB-based UL transmission," R1-1800626, 3GPP TSG RAN WG1 Meeting AH 1801, Vancouver, Canada Jan. 22-26, 2018.

* cited by examiner

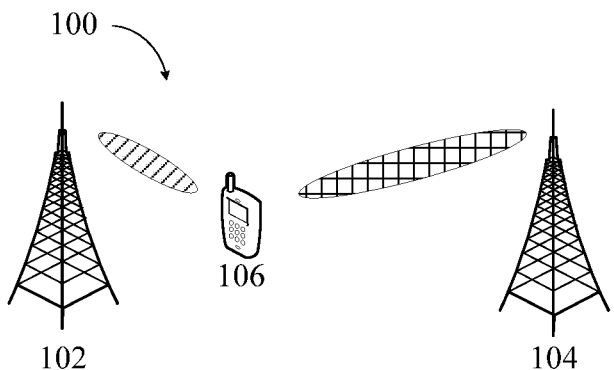

Fig. 1

Determining information of at least one sub-band in a frequency-domain resource for a transmission of an uplink signal according to a transmission parameter for the uplink signal and/or parameter information of the frequency-domain resource    201

Fig. 2

Obtaining, by a terminal, first information, wherein the first information is configured to indicate information of at least one sub-band in a frequency-domain resource for the transmission of the uplink signal of the terminal, and/or, configured to indicate an overhead and/or number of pieces of indication information, for the information of the at least one sub-band for the transmission of the uplink signal, sent by a network side    301

Fig. 3

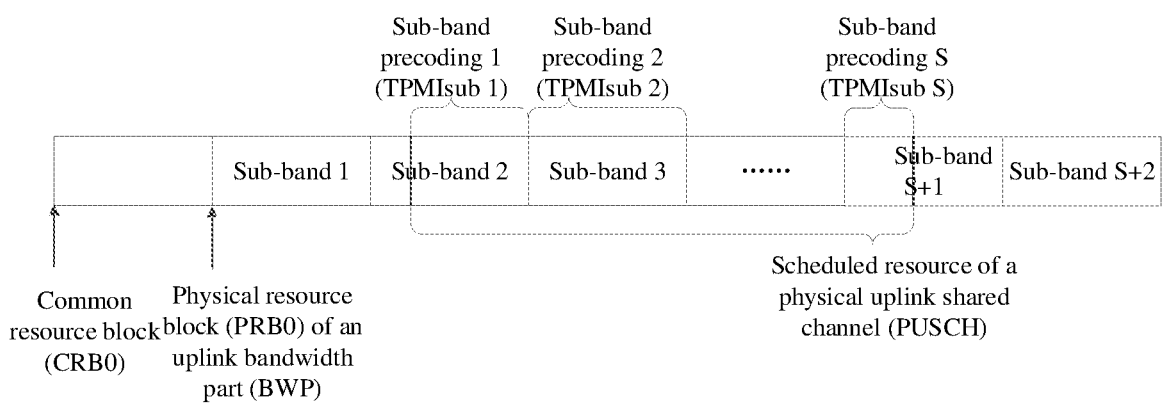

Fig. 4

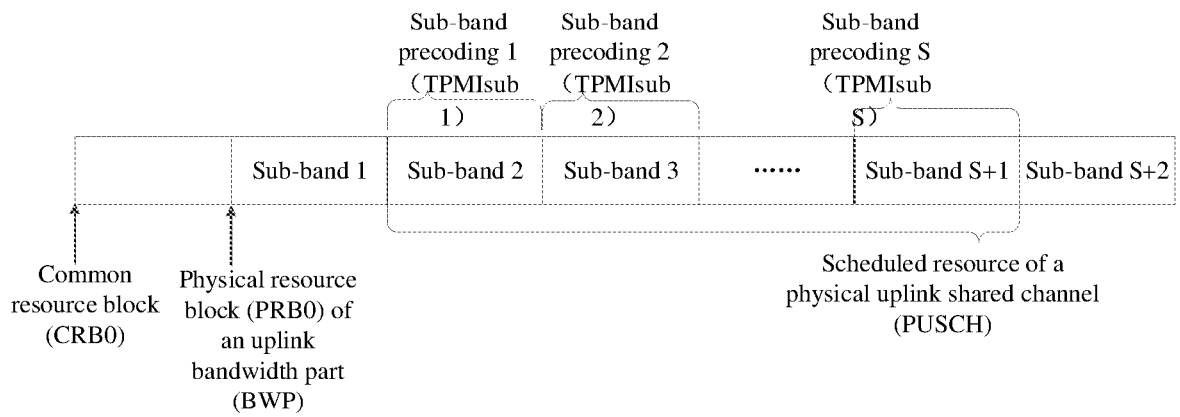

Fig. 5

Sending, by a network device, first information, wherein the first information is configured to indicate information of at least one sub-band in an uplink frequency-domain resource of a terminal, and/or, configured to indicate an overhead and/or number of pieces of indication information for the information of the at least one sub-band for the transmission of the uplink signal of the terminal — 601

Fig. 6

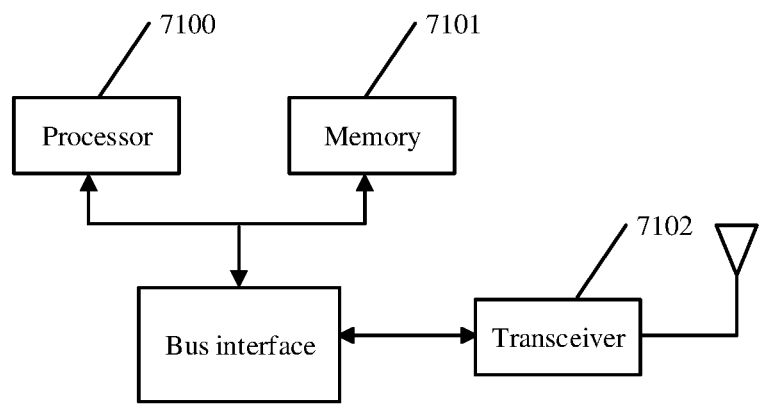

Fig. 7

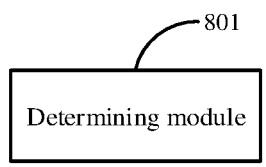

Fig. 8A

COMMUNICATION METHOD AND APPARATUS FOR DETERMINING INFORMATION OF SUB-BAND IN FREQUENCY-DOMAIN RESOURCE

CROSS-REFERENCE TO RELATED APPLICATIONS

The present disclosure is a National Stage of International Application No. PCT/CN2020/129126, filed on Nov. 16, 2020, which claims the priority of the Chinese patent application No. 201911371385.1 filed to the China National Intellectual Property Administration on Dec. 26, 2019, of which the entire contents are incorporated herein by reference.

FIELD

The present disclosure relates to the technical field of communication, in particular to a communication method and apparatus.

BACKGROUND

In an existing wireless communication system, such as a long term evolution (LTE) system, a new radio (NR) system, multiple input multiple output (MIMO) transmission of an uplink signal only supports wideband precoding, and does not support sub-band precoding.

For example, under a codebook-based physical uplink shared channel (PUSCH) uplink transmission solution, a base station may only indicate an uplink sounding reference signal (SRS) resource, a precoding matrix and a number of transmission layers of a wideband to a user equipment (UE). For example, the SRS resource is indicated through an SRS resource indicator field in a downlink control information (DCI) or a radio resource control (RRC) signaling, and the precoding matrix and the number of transmission layers are indicated through precoding information and a number of layers field in DCI or the RRC signaling. When the UE transmits the PUSCH, the same analog beam forming, precoding matrix and number of transmission layers are used on all scheduled frequency-domain resources.

The sub-band precoding will bring frequency-domain selective precoding gain, and improves performance of the transmission of the uplink signal. However, in the prior art, there is still no corresponding specific solution for the sub-band precoding for indicating the uplink signal.

SUMMARY

The present disclosure provides a communication method and apparatus, for improving transmission performance of an uplink signal.

In a first aspect, the present disclosure provides a communication method, including: determining information of at least one sub-band in a frequency-domain resource for a transmission of an uplink signal according to a transmission parameter for the uplink signal and/or parameter information of the frequency-domain resource.

In one possible implementation, the parameter information of the frequency-domain resource includes at least one of the following items: a band width of a bandwidth part (BWP) corresponding to the uplink signal, a resource range of frequency-domain resource allocation (RA) corresponding to the uplink signal, a band width of a component carrier corresponding to the uplink signal, or a band width of a serving cell corresponding to the uplink signal.

In one possible implementation, the transmission parameter includes at least one of the following items: information of an uplink sounding reference signal (SRS) resource, a codebook subset parameter sent by a network side, information of a number of transmission layers, whether the uplink signal is transmitted with full power, or a full-power transmission mode of the uplink signal.

In one possible implementation, the band width of the BWP corresponding to the uplink signal is: a band width of a BWP where the uplink signal is transmitted; or a band width of an uplink (UL) BWP being activated in a condition that the uplink signal is scheduled by a network side; or a maximum value of band widths of all UL BWPs configured by a network side for a carrier where the uplink signal is transmitted.

In one possible implementation, the band width of the component carrier corresponding to the uplink signal includes a band width of a component carrier where the uplink signal is transmitted; or the band width of the component carrier corresponding to the uplink signal is a band width of an uplink component carrier being activated in a condition that the uplink signal is scheduled by a network side; or the band width of the component carrier corresponding to the uplink signal is a maximum value of band widths of all uplink component carriers in a component carrier aggregation configured by a network side for the transmission of the uplink signal.

In one possible implementation, the information of the uplink SRS resource includes a number of antenna ports of an SRS resource in an SRS resource set with a usage which is consistent with a transmission mode of PUSCH, and/or a number of antenna ports of an SRS resource in an SRS resource set indicated by the network side, and/or a number of antenna ports of an SRS resource indicated by the network side.

In one possible implementation, the determining the information of the at least one sub-band for the transmission of the uplink signal according to the parameter information of the frequency-domain resource, includes: determining the information of the at least one sub-band for the transmission of the uplink signal according to a maximum number of antenna ports of at least one SRS resource in the SRS resource set with a usage which is consistent with an transmission mode of the uplink signal; or determining the information of the at least one sub-band for the transmission of the uplink signal according to a maximum number of the antenna ports of at least one SRS resource in the SRS resource set indicated by the network side; or determining the information of the at least one sub-band for the transmission of the uplink signal according to a number of the antenna ports of the SRS resource indicated by the network side; wherein each SRS resource set comprises at least one SRS resource.

In one possible implementation, the information of the number of transmission layers includes: a maximum number of transmission layers for the transmission of the uplink signal.

In one possible implementation, the maximum number of transmission layers for the transmission of the uplink signal includes: a maximum number of transmission layers corresponding to a transmission mode of the uplink signal supported by a terminal; or a maximum number of transmission layers corresponding to a transmission mode of the uplink signal configured by the network side for a terminal; or a smaller value of a number of transmission layers corresponding to a transmission mode of the uplink signal supported by a terminal and a maximum number of transmission layers corresponding to a transmission mode of the uplink signal configured by the network side for a terminal; or a minimum value among a number of antenna ports of an SRS resource corresponding to a transmission mode of the uplink signal, a maximum number of transmission layers corresponding to a transmission mode of the uplink signal supported by a terminal and a maximum number of transmission layers corresponding to a transmission mode of the uplink signal configured by the network side for the terminal; or a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal; or a smaller value of a number of antenna ports of an SRS resource under a transmission mode of the uplink signal and a maximum number of transmission layers corresponding to a transmission mode of the uplink signal supported by a terminal; or a smaller value of a number of antenna ports of an SRS resource indicated by the network side and a maximum number of transmission layers corresponding to a transmission mode of the uplink signal supported by a terminal; or a smaller value of a number of antenna ports of an SRS resource under a transmission mode of the uplink signal and a maximum number of transmission layers corresponding to a transmission mode of the uplink signal configured by the network side for a terminal; or a smaller value of a number of antenna ports of an SRS resource indicated by the network side and a maximum number of transmission layers corresponding to a transmission mode of the uplink signal configured by the network side for a terminal.

In one possible implementation, before the determining the information of the at least one sub-band in the frequency-domain resource for the transmission of the uplink signal according to the parameter information of the frequency-domain resource for the uplink signal and/or the transmission parameter, the method further includes: obtaining the parameter information of the frequency-domain resource for the transmission of the uplink signal and/or the transmission parameter for the uplink signal.

In one possible implementation, the determining the information of the at least one sub-band in the frequency-domain resource for the transmission of the uplink signal according to the transmission parameter for the uplink signal and/or the parameter information of the frequency-domain resource, includes: determining the information of the at least one sub-band in the frequency-domain resource according to the transmission parameter and/or the parameter information of the frequency-domain resource and a first corresponding relationship between the transmission parameter and/or the parameter information of the frequency-domain resource and the information of the at least one sub-band, wherein the first corresponding relationship is indicated by the network side through a signaling or is pre-determined by the terminal and the network side.

In one possible implementation, the information of the at least one sub-band includes one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band.

In one possible implementation, the determining the information of the at least one sub-band in the frequency-domain resource, includes: determining a number of pieces of and/or overhead of indication information for the information of the at least one sub-band in the frequency-domain resource.

In one possible implementation, the determining the overhead of the indication information for the information of the at least one sub-band for the transmission of the uplink signal, includes: determining an overhead of the indication information corresponding to each sub-band in the at least one sub-band for the transmission of the uplink signal; and/or determining tan overhead of the indication information for the at least one sub-band for the transmission of the uplink signal.

In one possible implementation, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

In one possible implementation, a number of sub-bands and a number of transmission precoding matrix indicators of the sub-bands are the same.

According to the above method, the terminal or a network device may determine the information of the sub-band according to the transmission parameter and/or the parameter information of the frequency-domain resource. Then the terminal may perform frequency selective precoding transmission on the uplink signal by using the determined sub-band information, thereby improving the transmission performance of the uplink signal.

In a second aspect, the present disclosure provides a communication method, including: obtaining first information by a terminal, wherein the first information is configured to indicate information of at least one sub-band in a frequency-domain resource for a transmission of an uplink signal of the terminal, and/or, configured to indicate an overhead and/or number of pieces of indication information for the information of the at least one sub-band for the transmission of the uplink signal sent by a network side.

In one possible implementation, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

In one possible implementation, the information of the sub-band includes at least one of the following items: a width of the sub-band, or the number of the sub-bands.

In one possible implementation, the overhead of the indication information for the information of the at least one sub-band for the transmission of the uplink signal, includes: an overhead of the indication information corresponding to each sub-band in the at least one sub-band for the transmission of the uplink signal; and/or the overhead of the indication information for the at least one sub-band for the transmission of the uplink signal.

In one possible implementation, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

According to the above method, the terminal may determine the information of the sub-band, and/or determine the number of pieces and/or overhead of the indication information for the information of the sub-band according to indication of the indication information. Then the terminal may perform frequency selective precoding transmission on the uplink signal by using the determined sub-band information or the number of pieces and/or overhead of the indication information for the information of the sub-band, thereby improving the transmission performance of the uplink signal.

In a third aspect, the present disclosure provides a communication method, including: sending first information by a network device, wherein the first information is configured to indicate information of at least one sub-band in an uplink frequency-domain resource of a terminal, and/or, configured to indicate an overhead and/or number of pieces of indication information for the information of the at least one sub-band for the transmission of the uplink signal of the terminal.

In one possible implementation, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

In one possible implementation, the information of the sub-band includes at least one of the following items: a width of the sub-band, or the number of the sub-bands.

In one possible implementation, the overhead of the indication information for the information of the at least one sub-band for the transmission of the uplink signal, includes: an overhead of the indication information corresponding to each sub-band in the at least one sub-band for the transmission of the uplink signal; and/or an overhead of the indication information for the at least one sub-band for the transmission of the uplink signal.

In one possible implementation, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

According to the above method, the network device may indicate the information of the sub-band, and/or the number of pieces and/or overhead of the indication information for the information of the sub-band to the terminal. Then the terminal may perform frequency selective precoding transmission on the uplink signal according to the indicated sub-band information or the number of pieces and/or overhead of the indication information for the information of the sub-band, thereby improving the transmission performance of the uplink signal.

In a fourth aspect, the present disclosure provides a communication apparatus, including: a determining module, configured to determine information of at least one sub-band in a frequency-domain resource, and/or, a number of pieces of and/or overhead of indication information for the information of the at least one sub-band for the transmission of the uplink signal according to a transmission parameter for and/or parameter information of the frequency-domain resource for a transmission of an uplink signal.

In one possible implementation, in the determining module, the parameter information of the frequency-domain resource includes at least one of the following items: a band width of a BWP corresponding to the uplink signal, a resource range of RA corresponding to the uplink signal, a band width of a component carrier corresponding to the uplink signal, or a band width of a serving cell corresponding to the uplink signal.

In one possible implementation, in the determining module, the transmission parameter includes at least one of the following items: information of an SRS resource, a codebook subset parameter sent by a network side, information of a number of transmission layers, whether the uplink signal is transmitted with full power, or a full-power transmission mode of the uplink signal.

In one possible implementation, in the determining module, the band width of the BWP corresponding to the uplink signal is: a band width of a BWP where the uplink signal is transmitted, or a band width of a UL BWP being activated in a condition that the uplink signal is scheduled by a network side, or a maximum value of band widths of all UL BWPs configured by a network side for a carrier where the uplink signal is transmitted.

In one possible implementation, in the determining module, the band width of the component carrier corresponding to the uplink signal includes a band width of a component carrier where the uplink signal is transmitted; or the band width of the component carrier corresponding to the uplink signal is a band width of an uplink component carrier being activated in a condition that the uplink signal is scheduled by a network side; or the band width of the component carrier corresponding to the uplink signal is a maximum value of band widths of all uplink component carriers in a component carrier aggregation configured by a network side for the transmission of the uplink signal.

In one possible implementation, in the determining module, the SRS resource information includes a number of antenna ports of an SRS resource in an SRS resource set with a usage which is consistent with a transmission mode of PUSCH, and/or a number of antenna ports of an SRS resource in an SRS resource set indicated by the network side, and/or a number of antenna ports of an SRS resource indicated by the network side.

In one possible implementation, the determining module is configured to determine the indication information for the information of the at least one sub-band for the transmission of the uplink signal according to a maximum number of antenna ports of at least one SRS resource in the SRS resource set with a usage which is consistent with an transmission mode of the uplink signal; or determine the indication information for the information of the at least one sub-band for the transmission of the uplink signal according to a maximum number of the antenna ports of at least one SRS resource in the SRS resource set indicated by the network side; or determine the indication information for the information of the at least one sub-band for the transmission of the uplink signal according to a number of the antenna ports of the SRS resource indicated by the network side; wherein each SRS resource set comprises at least one SRS resource.

In one possible implementation, in the determining module, the information of the number of transmission layers includes: a maximum number of transmission layers corresponding to a transmission mode of the uplink signal supported by a terminal; or a maximum number of transmission layers corresponding to a transmission mode of the uplink signal configured by the network side for a terminal; or a smaller value of a number of transmission layers corresponding to a transmission mode of the uplink signal supported by a terminal and a maximum number of transmission layers corresponding to a transmission mode of the uplink signal configured by the network side for a terminal; or a minimum value among a number of antenna ports of an SRS resource corresponding to a transmission mode of the uplink signal, a maximum number of transmission layers corresponding to a transmission mode of the uplink signal supported by a terminal and a maximum number of transmission layers corresponding to a transmission mode of the uplink signal configured by the network side for the terminal; or a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal; or a smaller value of a number of antenna ports of an SRS resource under a transmission mode of the uplink signal and a maximum number of transmission layers corresponding to a transmission mode of the uplink signal supported by a terminal; or a smaller value of a number of antenna ports of an SRS resource indicated by the network side and a maximum number of transmission layers corresponding to a transmission mode of the uplink signal supported by a terminal; or a smaller value of a number of antenna ports of an SRS resource under a transmission mode of the uplink signal and a maximum number of transmission layers corresponding to a transmission mode of the uplink signal configured by the network side for a terminal; or a smaller value of a number of antenna ports of an SRS resource indicated by the network side and a maximum number of transmission layers corresponding to a transmission mode of the uplink signal configured by the network side for a terminal.

In one possible implementation, the apparatus further includes an obtaining module.

The obtaining module is configured to obtain the transmission parameter for the transmission of the uplink signal and/or the parameter information of the frequency-domain resource for the uplink signal.

In one possible implementation, the determining module is configured to determine the information of the at least one sub-band in the frequency-domain resource according to the transmission parameter and/or the parameter information of the frequency-domain resource and a first corresponding relationship between the transmission parameter and/or the parameter information of the frequency-domain resource and the information of the at least one sub-band, wherein the first corresponding relationship is indicated by the network side through a signaling or is pre-determined by the terminal and the network side.

In one possible implementation, the determining module is configured to determine the number of pieces and/or overhead of the indication information for the information of the at least one sub-band for the transmission of the uplink signal according to the transmission parameter and/or the parameter information of the frequency-domain resource and a second corresponding relationship between the transmission parameter and/or the parameter information of the frequency-domain resource and the overhead of the indication information for the information of the at least one sub-band.

The second corresponding relationship is indicated by the network side through a signaling or is pre-determined by the terminal and the network side.

In one possible implementation, in the determining module, the information of sub-band includes one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band.

In one possible implementation, the determining module is configured to determine an overhead of the indication information corresponding to each sub-band in the at least one sub-band for the transmission of the uplink signal; and/or determine the overhead of the indication information for the at least one sub-band for the transmission of the uplink signal.

In one possible implementation, in the determining module, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

In one possible implementation, in the determining module, a number of sub-bands and a number of transmission precoding matrix indicators of the sub-bands are the same.

In a fifth aspect, the present disclosure provides a communication apparatus, including: an obtaining module, configured to obtain first information, wherein the first information is configured to indicate information of at least one sub-band in a frequency-domain resource for the transmission of uplink signal of a terminal, and/or, configured to indicate an overhead and/or number of pieces of indication information for the information of the at least one sub-band for the transmission of the uplink signal sent by a network side.

In one possible implementation, in the determining module, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

In one possible implementation, in the determining module, the information of the sub-band includes at least one of the following items: a width of the sub-band, or the number of the sub-bands.

In one possible implementation, in the determining module, the overhead of the indication information for the information of the at least one sub-band for the transmission of uplink signal, includes: an overhead of the indication information corresponding to each sub-band in the at least one sub-band for the transmission of the uplink signal; and/or the overhead of the indication information for the at least one sub-band for the transmission of the uplink signal.

In one possible implementation, in the determining module, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

In a sixth aspect, the present disclosure provides a communication apparatus, including: a sending module, configured to send first information, wherein the first information is configured to indicate information of at least one sub-band in an uplink frequency-domain resource of a terminal, and/or, configured to indicate an overhead and/or number of pieces of indication information for the information of the at least one sub-band for the transmission of uplink signal of the terminal.

In one possible implementation, in the determining module, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

In one possible implementation, in the determining module, the information of the sub-band includes at least one of the following items: a width of the sub-band, or the number of the sub-bands.

In one possible implementation, in the determining module, the overhead of the indication information for the information of the at least one sub-band for the transmission of uplink signal, includes: an overhead of the indication information corresponding to each sub-band in the at least one sub-band for the transmission of the uplink signal; and/or the overhead of the indication information for the at least one sub-band for the transmission of the uplink signal.

In one possible implementation, in the determining module, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

In a seventh aspect, the present disclosure further provides a computer readable storage medium, storing a computer program. The program, when executed by a processor, implements the steps of the method in the first aspect, the second aspect or the third aspect.

In an eight aspect, the present disclosure further provides a communication apparatus, including a processor and a memory. The memory is configured to store a computer executable instruction. When the processor executes the computer executable instruction, the apparatus is caused to execute the steps of the method in the first aspect, the second aspect or the third aspect.

In addition, technical effects brought by any implementation in the fourth aspect to the seventh aspect may refer to the technical effects brought by different implementations in the first aspect, which is not repeated here.

Other features and advantages of the present disclosure will be illustrated in the subsequent specification, and partially become obvious from the specification, or be known by implementing the present disclosure. The objective and other advantages of the present disclosure may be implemented and obtained through specifically pointed out structures in the written specification, claim and drawings.

BRIEF DESCRIPTION OF THE DRAWINGS

In order to illustrate the technical solution of the embodiments of the present disclosure more clearly, drawings needing to be used in the embodiments of the present disclosure will be introduced below briefly. Obviously, the drawings introduced below are only some embodiments of the present disclosure, those skilled in the art can further obtain other drawings according to these drawings without inventive efforts.

FIG. 1 is an architecture diagram of a communication system provided by an embodiment of the present disclosure.

FIG. 2 is a schematic flow diagram of a communication method in an embodiment of the present disclosure.

FIG. 3 is a schematic flow diagram of a communication method in an embodiment of the present disclosure.

FIG. 4 is a schematic diagram of a sub-band on an uplink resource in an embodiment of the present disclosure.

FIG. 5 is a schematic diagram of a sub-band on an uplink resource in an embodiment of the present disclosure.

FIG. 6 is a schematic flow diagram of a communication method in an embodiment of the present disclosure.

FIG. 7 is a schematic diagram of a communication apparatus in an embodiment of the present disclosure.

FIG. 8A is a schematic diagram of a communication apparatus in an embodiment of the present disclosure.

DETAILED DESCRIPTION OF THE EMBODIMENTS

Figure 8B:
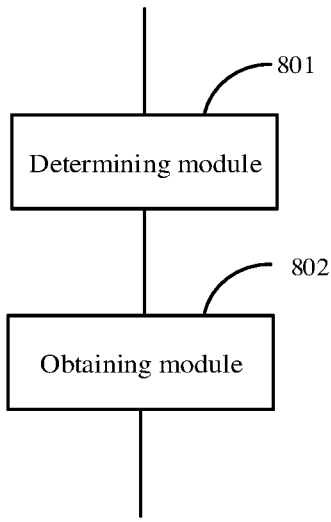
FIG. 8B is a schematic diagram of another communication apparatus in an embodiment of the present disclosure.

The technical solution in the present disclosure will be described below with reference to drawings.

The technical solution in the embodiment of the present disclosure may be applied to various communication systems, for example: an LTE system, a worldwide interoperability for microwave access (WiMAX) communication system, a future 5th Generation (5G) system, such as a new radio access technology (NRAT), and a future communication system such as a 6th Generation (6G) system.

The present disclosure will present all the aspects, embodiments or features around a system including a plurality of devices, components, modules, etc. It should be understood and known that all the systems may include other devices, components, modules, etc., and/or may not include all the devices, components, modules, and the like discussed with reference to the drawings. In addition, combinations of these solutions may further be used.

In addition, in the embodiment of the present disclosure, the word "exemplary" is configured to represent being an example, example illustration or description. Any embodiment or design solution described as "examples" in the present disclosure should not be explained being more preferred or having more advantages than other embodiments or design solutions. Exactly speaking, the word "example" is used to be aimed at present the concept in a specific mode.

In the embodiment of the present disclosure, information, signal, message and channel sometimes may be used together. It should be pointed out that the meanings wanted to be expressed by them are consistent when their differences are not emphasized. The "of", "corresponding or relevant" and "corresponding" sometimes may be blended. It should be pointed out that the meanings wanted to be expressed by them are consistent when their differences are not emphasized.

A network architecture and a service scenario described by the embodiment of the present disclosure are for the purpose of illustrating the technical solution of the embodiment of the present disclosure more clearly, and do not constitute limitation to the technical solution provided by the embodiment of the present disclosure. Those skilled in the art should know that with evolution of the network architecture and occurrence of the new service scenario, the technical solution provided by the embodiment of the present disclosure is also applicable for the similar technical problem.

The embodiment of the present disclosure may be applied to a traditional typical network, or a future network with the UE as the center (UE-centric). The UE-centric network introduces a non-cell network architecture, that is, a large amount of small stations are deployed in a certain region to constitute a Hyper cell, and each small station is a transmission point (TP) or a transmission and reception point (TRP) of the Hyper cell, and is connected with a centralized controller. When the UE moves in the Hyper cell, the network side device constantly selects a new sub-cluster for the UE to serve for it, so as to avoid true cell handover, and achieve service continuity for the UE. The network side device includes a wireless network device. Or, in the UE-centric network, multiple network side devices, such as the small stations, each may have an independent controller, such as a distributed controller. The small stations each can independently schedule a user equipment, and there is interaction information among the small stations in a long term, so that a certain flexibility may exist when a coordinated service is provided for the UE.

For conveniently understanding the embodiment of the present disclosure, a communication system applicable to the embodiment of the present disclosure is illustrated in detail by taking an example of the communication system shown in FIG. 1. FIG. 1 shows a schematic diagram of a communication system applicable to a communication method of the embodiment of the present disclosure. As shown in FIG. 1, the communication system 100 includes a network device 102 and a terminal device 106. The network device 102 may be configured with a plurality of antennas, and the terminal device may also be configured with a plurality of antennas. Optionally, the communication system may include a network device 104. The network device 104 may also be configured with a plurality of antennas.

It should be understood that the network device 102 or the network device 104 may further include multiple parts (for example, a processor, a modulator, a multiplexer, a demodulator or a demultiplexer, etc.) relevant to signal transmission and reception.

The network device is a device with a wireless transceiving function or with a chip capable of being set in the device. The device includes but not limited to: an evolved Node B (eNB), a radio network controller (RNC), a node B (NB), a base station controller (BSC), a base transceiver station (BTS), a femto (such as a home evolved NodeB, or a home Node B, HNB), a baseband unit (BBU), an access point (AP) in a wireless fidelity (WIFI) system, a wireless relay node, a wireless return node, TRP or TP, etc., may also be gNB in 5G system, such as NR, or TRP or TP, one or more sets (including a plurality of antenna panels) of antenna panels of a base station in the 5G system, or may further be a network node, e.g., BBU, or a distributed unit (DU), constituting gNB or a transmission point.

The terminal device may also be called UE, an access terminal, a user unit, a user station, a mobile station, a mobile site, a remote station, a remote terminal, a mobile device, a user terminal, a terminal, a wireless communication device, a user agent or a user apparatus. The terminal device in the embodiment of the present disclosure may be a mobile phone, a tablet computer (Pad), a computer with a wireless transceiving function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home and the like. The embodiment of the present disclosure does not limit to the application scenario. In the present disclosure, the terminal device with the wireless transceiving function and the chip capable of being set in the aforementioned terminal device are collectively referred to the terminal device.

In the communication system 100, both the network device 102 and the network device 104 may communicate with the plurality of terminal devices (such as the terminal device 106 shown in the figure). The network device 102 and the network device 104 may communicate with the one or more terminal devices similar to the terminal device 106. But it should be understood that the terminal device communicating with the network device 102 and the terminal device communicating with the network device 104 may be the same or different. The terminal device 106 shown in FIG. 1 may communicate with the network device 102 and the network device 104 at the same time, but this only shows one possible scenario. In certain scenarios, the terminal device may only communicate with the network device 102 or the network device 104, which is not limited by the present disclosure.

It should be understood that FIG. 1 is only a simplified schematic diagram illustrated for facilitating understanding. The communication system may further include other network devices or other terminal devices, which is not drawn in FIG. 1.

The embodiment of the present disclosure is illustrated in detail with reference to the drawings.

It should be understood that the technical solution of the present disclosure may be applied to the wireless communication system, such as the communication system 100 as shown in FIG. 1. The communication system may include one network device and at least one terminal device, and the network device and the terminal device may communicate with each other through a wireless radio. For example, the network device in the communication system may correspond to the network device 102 and the network device 104 as shown in FIG. 1, and the terminal device may correspond to the terminal device 106 as shown in FIG. 1.

The embodiment of the present disclosure is illustrated below in detail without loss of generality by taking an example of an interaction process between one terminal device and the network device. The terminal device may be the terminal device having a wireless connection relationship with the network device in the wireless communication system. It may be understood that the network device and the plurality of terminal devices having the wireless connection relationship in the wireless communication system may transmit a data packet based on the same technical solution. The present disclosure does not limit this.

FIG. 2 is a schematic flow diagram of a communication method in an embodiment of the present disclosure. As shown in FIG. 2, the method may include the following steps.

S201, information of at least one sub-band in a frequency-domain resource for a transmission of an uplink signal is determined according to a transmission parameter for the uplink signal and/or parameter information of the frequency-domain resource.

An implementation subject of the communication method provided by the embodiment of the present disclosure may be a terminal or a network device.

1. in the condition that the implementation subject is the terminal, before determining information of the at least one sub-band in the frequency-domain resource, and/or, determining the number of pieces and/or overhead of the indication information of the information of the at least one sub-band for the transmission of the uplink signal according to the transmission parameter for the uplink signal and/or the parameter information of the frequency-domain resource for the transmission of the uplink signal, the following steps may further be included: the transmission parameter for the uplink signal and/or the parameter information of the frequency-domain resource for the transmission of the uplink signal are obtained.

Here, the parameter information of the frequency-domain resource for the transmission of the uplink signal and the transmission parameter for the uplink signal may be both sent by a network side or be locally configured by the terminal.

2, In the condition that the implementation subject is the network device, such as a base station, the transmission parameter for the uplink signal and/or the parameter information of the frequency-domain resource for the transmission of the uplink signal here may be the transmission parameter and/or the parameter information of the frequency-domain resource pre-configured by the network device, or the transmission parameter and/or the parameter information of the frequency-domain resource expected to be configured by the network device for the terminal (not configured yet).

It should be noted that the following embodiment 1 to embodiment 12 all take an example that the implementation subject is the terminal to explain and illustrate the communication method provided by the present disclosure, and the implementation method of the network device may be implemented correspondingly referring to the implementation method of the terminal.

It should be noted that an uplink signal in the embodiment of the present disclosure is elaborated and illustrated by taking a PUSCH signal as an example. The applicable uplink signal includes but not limited to the PUSCH signal, a demodulation reference signal (DMRS), a physical uplink control channel (PUCCH) signal, a physical random access channel (PRACH) signal, and an SRS.

In one embodiment, the parameter information of the frequency-domain resource includes at least one of the following items: a band width of a bandwidth part (BWP) corresponding to the uplink signal, a resource range of frequency-domain resource allocation (RA) corresponding to the uplink signal, a band width of a component carrier (CC) corresponding to the uplink signal, and a band width of a serving cell corresponding to the uplink signal.

In one embodiment, the transmission parameter includes at least one of the following items: information of an SRS resource, a codebook subset parameter sent by a network side, information of a number of transmission layers, whether the uplink signal is transmitted with full power, or a full-power transmission mode of the uplink signal.

In one embodiment, the information of the at least one sub-band includes one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band. The transmission precoding matrix indicator of the sub-band may be an indicator corresponding to a precoding matrix of one sub-band. When the resource allocated by the network side for the transmission of the uplink signal contains the plurality of sub-bands, the network side needs to send the transmission precoding matrix indicators of the plurality of sub-bands to the terminal.

Optionally, the network side further sends transmission precoding matrix indicator (TPMI) of the sub-band to the terminal. The TPMI of the sub-band is configured to indicate the precoding matrix of the sub-band, and the number of the sub-bands and the number of the TPMIs of the sub-band are the same.

In the present embodiment, the spatial related information of the sub-band may be indication information configured to indicate an analog beam forming parameter or a spatial filtering parameter of the sub-band. For example, the spatial related information indicates a reference signal. When the spatial related information indicates the reference signal, the terminal may send the uplink signal by using a spatial filter (SF) for sending or receiving the reference signal. That is, the terminal may determine the sub-band spatial filtering parameter for sending the uplink signal by utilizing the spatial related information of the sub-band. Optionally, when the spatial related information indicates that the reference signal is the uplink signal, the terminal uses the spatial filter for sending the signal to send the uplink signal. When the spatial related information indicates that the reference signal is a downlink signal, the terminal uses the spatial filter for receiving the signal to send the uplink signal. Optionally, the spatial related information is configured through an RRC signaling. Optionally, the spatial related information is configured or indicated through a parameter for configuring a quasi co-location (QCL).

Optionally, the overhead of the sub-band is a bit width of the sub-band.

How to determine the information of the at least one sub-band in the frequency-domain resource is explained and illustrated below.

In one embodiment, the determining the information of the at least one sub-band in the frequency-domain resource according to the transmission parameter and/or the parameter information of the frequency-domain resource includes: the information of the at least one sub-band in the frequency-domain resource is determined according to the transmission parameter and/or the parameter information of the frequency-domain resource and a first corresponding relationship between the transmission parameter and/or the parameter information of the frequency-domain resource and the information of the at least one sub-band, wherein the first corresponding relationship is indicated by the network side through a signaling or predetermined by the terminal and the network side. How to determine the information of the at least one sub-band in the frequency-domain resource is illustrated below aiming at the parameter information of each kinds of frequency-domain resources and each kinds of transmission parameters.

Firstly, how to determine the information of the at least one sub-band in the frequency-domain resource is exemplified according to the parameter information of the frequency-domain resource.

Embodiment 1

The parameter information of the frequency-domain resource is a band width of a BWP corresponding to the uplink signal.

The band width of the BWP corresponding to the uplink signal here may be a band width of the BWP where an uplink signal is transmitted, such as a band width of the BWP where a signal on the PUSCH is transmitted. Or, the band width of the BWP corresponding to the uplink signal here may be a band width of an uplink (UL) BWP being activated when the network side schedules the uplink signal. For example, the uplink signal is scheduled by the network side (such as the PUSCH signal) through a DCI format 0_1 signaling. When the network side sends the DCI format 0_1 signaling to the terminal, a pair of uplink BWP and downlink BWP may be activated at the same time. The activated downlink BWP bears the DCI format 0_1 signaling, while the band width of the activated uplink BWP is the band width of the BWP corresponding to the uplink signal. Or, the band width of the BWP corresponding to the uplink signal here may be a maximum value of band widths of all the UL BWPs configured by a carrier where the uplink signal is transmitted. For example, a carrier where the PUSCH signal is transmitted is configured with the plurality of UL BWPs, wherein the band width sizes of the plurality of UL BWPs may be the same or different, while the band width of the BWP corresponding to the PUSCH signal may be the maximum value (it may be any UL BWP band width if the band width sizes of the plurality of UL BWPs are the same) of the band widths of the plurality of above UL BWPs.

Optionally, the terminal may determine the information of the at least one sub-band in the frequency-domain resource according to the band width of the BWP corresponding to the uplink signal and the corresponding relationship (the first corresponding relationship) between the band width of the BWP corresponding to the uplink signal and the information of the at least one sub-band in the frequency-domain resource. The corresponding relationship here may be pre-determined (such as protocol agreement) by the network side and the terminal, or be indicated by the network side through the signaling, such as through a RRC signaling, or be pre-indicated to the terminal through a media access control (MAC) signaling and the like. For example, taking an example that the information of the at least one sub-band is the number of the sub-bands, it is assumed that the network side pre-indicates the corresponding relationship to the terminal through the RRC signaling: when the band width of the BWP corresponding to the PUSCH signal is N physical resource blocks (PRBs), the corresponding number of sub-bands is M, and N and M are both positive integers. If the terminal determines that the band width of the BWP corresponding to the PUSCH signal is N PRBs, it may be determined again that the number of the sub-bands is M according to the corresponding relationship pre-indicated by the network side.

Further, the band width of the BWP corresponding to the uplink signal may be divided into the different ranges. As for the BWP falling in the specific band width range, the information of the at least one sub-band may be known in advance. In other words, the corresponding relationship between the band width of the BWP and the information of the at least one sub-band in the frequency-domain resource may be that the BWPs with the different band width ranges correspond to information of the different sub-bands. The corresponding relationship here may also be pre-determined by the network side and the terminal (such as through protocol agreement), or indicated by the network side through the signaling, such as through the RRC signaling, or pre-indicated to the terminal through an MAC signaling and the like.

Optionally, the corresponding relationship between the band width of the BWP corresponding to the uplink signal and the information of the at least one sub-band in the frequency-domain resource may be expressed in a table form.

For example, illustration is made by taking an example that the information of the at least one sub-band is the number of the sub-bands. Table 1 is a corresponding relationship table of the band width of the BWP and the number of the sub-bands.

TABLE 1

| The band width $N_{BWP}$ of the BWP (PRB number) | The number of the sub-bands |
|---|---|
| $N_2 < N_{BWP} \leq N_1$ | $M_1$ |
| $N_3 < N_{BWP} \leq N_2$ | $M_2$ |
| ... | ... |
| $N_{BWP} \leq N_s$ | $M_s$ |

Wherein, $N_1, N_2, \ldots, N_s, M_1, M_2, \ldots M_s$, and s are positive integers. The corresponding relationship between the band width of the BWP corresponding to the uplink signal and the number of the sub-bands contained in Table 1 may be indicated by the network side to the terminal, or be pre-determined by the terminal and the network side.

For another example, illustration is made by taking an example that the information of the at least one sub-band is the band width of the sub-band. Table 2 is a corresponding relationship table between the band width of the BWP and the band width of the sub-band.

TABLE 2

| The band width $N_{BWP}$ of the BWP (PRB number) | The band width of the sub-band (PRB number) |
|---|---|
| $N_2 < N_{BWP} \leq N_1$ | $L_1$ |
| $N_3 < N_{BWP} \leq N_2$ | $L_2$ |
| ... | ... |
| $N_{BWP} \leq N_s$ | $L_s$ |

Where, $N_1, N_2, \ldots, L_s, L_1, L_2, \ldots, L_s$, and s are positive integers. The corresponding relationship between the band width of the BWP corresponding to the uplink signal and the band width of the sub-band contained in Table 2 may be indicated by the network side to the terminal, or be pre-determined by the terminal and the network side.

Optionally, the terminal may further determine the band width of the sub-band according to the number of the sub-bands. For example, the band width of the sub-band is: $N_{BWP} - M_i \lfloor N_{BWP}/M_i \rfloor$ in one sub-band, and is $\lfloor N_{BWP}/M_i \rfloor$ in other sub-bands, where $M_i$ is the number of the sub-bands corresponding to the band width of the BWP.

Optionally, the network side and the terminal may determine the certain corresponding relationship between the band width of the BWP corresponding to the uplink signal and the number of the sub-bands through a protocol. Each BWP band width range corresponds to one or multiple sub-band quantities. When the certain band width range of the BWP corresponds to multiple sub-band quantities, the network side may indicate the number of sub-bands during the actual transmission of the uplink signal to the terminal through the signaling. For example, when the band width range of the BWP is $N_2 \leq N_{BWP} \leq N_1$, values of the numbers of sub-bands may be X and Y, and thus the network side may indicate the UE to use the number of sub-bands X or Y during actual transmission of the uplink signal through the signaling. Optionally, the network side and the terminal may determine the certain corresponding relationship between the band width of the BWP corresponding to the uplink signal and the band width of the sub-band through a protocol. Each BWP band width range corresponds to one or more sub-band band widths, when the certain band width range of the BWP corresponds to multiple sub-band band widths, the network side may indicate the sub-band band width during the actual transmission of the uplink signal to the terminal through the signaling.

Embodiment 2

The parameter information of the frequency-domain resource is a resource range of RA corresponding to the uplink signal.

The RA corresponding to the uplink signal here may be a frequency-domain resource configured or allocated by the network side for the uplink signal, and the terminal transmits the uplink signal on these frequency-domain resources. The RA may be all or partial resource blocks (RB) of one uplink carrier allocated by the network side for the uplink signal, or all or partial RBs in one uplink BWP allocated by the network for the uplink signal.

Optionally, the terminal may determine the information of the at least one sub-band in the frequency-domain resource according to the resource range of the RA and the corresponding relationship (a first corresponding relationship) between the resource range of the RA and the information of the at least one sub-band in the frequency-domain resource. The corresponding relationship here may be pre-determined by the network side and the terminal (such as through a protocol), or be indicated by the network side through the signaling, such as through the RRC signaling, or be pre-indicated to the terminal through the MAC signaling and the like. For example, taking an example that the information of the at least on sub-band is the number of the sub-bands, it is assumed that the network side pre-indicates the corresponding relationship to the terminal through the RRC signaling: when the resource range of the frequency-domain RA is N PRBs, the corresponding number of sub-bands is M, and N and M are both positive integers. If the terminal determines that the resource range of the RA is N PRBs, it may be determined again that the number of the sub-bands is M according to the corresponding relationship pre-indicated by the network side.

Further, the resource range of the RA may be divided into some different ranges. As for the resource range of the RA falling in the specific range, the information of the at least one sub-band may be known in advance. In other words, the corresponding relationship between the resource range of the RA and the information of the at least one sub-band in the frequency-domain resource may be: the different resource ranges of the RA correspond to information of the different sub-bands, and the corresponding relationship here may also be pre-determined by the network side and the terminal (such as through protocol agreement), or indicated by the network side through the signaling, such as through the RRC signaling, or pre-indicated to the terminal through the MAC signaling and the like.

Optionally, the corresponding relationship between the resource range of the RA and the information of the at least one sub-band in the frequency-domain resource may be expressed in a table form.

For example, illustration is made by taking an example that the information of the at least one sub-band is the number of the sub-bands. Table 3 is a corresponding relationship table of the resource range of the frequency-domain RA and the number of the sub-bands.

TABLE 3

| The resource range $N_{RA}$ of the frequency-domain RA (PRB number) | The number of the sub-bands |
|---|---|
| $N_2 < N_{RA} \leq N_1$ | $M_1$ |
| $N_3 < N_{RA} \leq N_2$ | $M_2$ |
| ... | ... |
| $N_{RA} \leq N_s$ | $M_s$ |

Where, $N_1, N_2, \ldots, N_s, M_1, M_2, \ldots, M_s$, and s are positive integers. The corresponding relationship between the resource range of the frequency-domain RA and the number of the sub-bands contained in Table 3 may be indicated by the network side to the terminal, or be pre-determined by the terminal and the network side.

For another example, illustration is made by taking an example that the information of the at least one sub-band is the band width of the sub-band. Table 4 is a corresponding relationship table between the resource range of the frequency-domain RA and the band width of the sub-band.

TABLE 4

| The resource range $N_{RA}$ of the frequency-domain RA (PRB number) | The band width of the sub-band (PRB number) |
|---|---|
| $N_2 < N_{RA} \leq N_1$ | $L_1$ |
| $N_3 < N_{RA} \leq N_2$ | $L_2$ |
| ... | ... |
| $N_{RA} \leq N_s$ | $L_s$ |

Where, $N_1, N_2, \ldots, L_s, L_1, L_2, \ldots L_s$, and s are positive integers. The corresponding relationship between the resource range of the frequency-domain RA and the band width of the sub-band contained in Table 4 may be indicated by the network side to the terminal, or be pre-determined by the terminal and the network side.

Optionally, the terminal may further determine the band width of the sub-band according to the number of the sub-bands. For example, the band width of the sub-band is: $N_{RA} - M_i \lfloor N_{RA}/M_i \rfloor$ in one sub-band, and is $\lfloor N_{RA}/M_i \rfloor$ in other sub-bands, where $M_i$ is the number of the sub-bands corresponding to the resource range of the frequency-domain RA.

Optionally, the network side and the terminal may determine the certain corresponding relationship between the resource range of the RA corresponding to the uplink signal and the number of the sub-bands through a protocol. Each resource range of the RA corresponds to one or multiple sub-band quantities. When the certain resource range of the RA corresponds to the multiple sub-band quantities, the network side may indicate the number of sub-bands during the actual transmission of the uplink signal to the terminal through the signaling. For example, when the resource range of the RA is $N_2 < N_{BWP} \leq N_1$, a value of the number of sub-bands may be X and Y, and thus the network side may indicate the UE to use the number of sub-bands X or Y during actual transmission of the uplink signal through the signaling.

Optionally, the network side and the terminal may determine the certain corresponding relationship between the resource range of the frequency-domain RA corresponding to the uplink signal and the band width of the sub-band through a protocol. Each resource range of the RA corresponds to one or more sub-band band widths, when the certain resource range of the RA corresponds to the multiple sub-band band widths, the network side may indicate the sub-band band width during the actual transmission of the uplink signal to the terminal through the signaling.

Embodiment 3

The parameter information of the frequency-domain resource is a band width of the CC corresponding to the uplink signal.

The band width of the CC corresponding to the uplink signal here may be a band width of the CC where an uplink signal is transmitted, such as a band width of the CC where a signal on the PUSCH is transmitted. Or, the band width of the CC corresponding to the uplink signal here may be a band width of UL CC activated when the uplink signal is scheduled by the network side. For example, the uplink signal is scheduled by the network side (such as the PUSCH signal) through a DCI format 0_1 signaling. When the network side sends the DCI format 0_1 signaling to the terminal, uplink CC and downlink CC may be activated at the same time. The activated downlink CC bears the DCI format 0_1 signaling, while the band width of the activated uplink CC is the band width of the CC corresponding to the uplink signal. Or, the band width of the CC corresponding to the uplink signal here may be a maximum value of the values of all the uplink CCs configured in a CC aggregation for the transmission of the uplink signal. For example, a PUSCH signal transmission CC aggregation is configured with the plurality of uplink CCs, wherein the band width sizes of the plurality of uplink CCs may be the same or different, while the band width of the CC corresponding to the PUSCH signal may be the maximum value (it may be the band width of any uplink CC if the band width sizes of the plurality of uplink CCs are the same) of the band widths of the plurality of above uplink CCs.

Optionally, the terminal may determine the information of the at least one sub-band in the frequency-domain resource according to the band width of the CC corresponding to the uplink signal and the corresponding relationship (a first corresponding relationship) between the band width of the CC corresponding to the uplink signal and the information of the at least one sub-band in the frequency-domain resource. The corresponding relationship here may be pre-determined (such as protocol agreement) by the network side and the terminal, or be indicated by the network side through the signaling, such as through the RRC signaling, or be pre-indicated to the terminal through the MAC signaling and the like. For example, taking an example that the information of the at least one sub-band is the number of the sub-bands, it is assumed that the network side pre-indicates the corresponding relationship to the terminal through the RRC signaling: when the band width of the CC corresponding to the PUSCH signal is N PRBs, the corresponding number of sub-bands is M, and N and M are both positive integers. If the terminal determines that the band width of the CC corresponding to the PUSCH signal is N PRBs, it may be determined again that the number of the sub-bands is M according to the corresponding relationship pre-indicated by the network side.

Further, the band width of the CC corresponding to the uplink signal may be divided into some different ranges. As for the CC falling in the specific band width range, the information of the at least one sub-band may be known in advance. In other words, the corresponding relationship between the band width of the CC and the information of the at least one sub-band in the frequency-domain resource may be that the CCs with the different band width ranges correspond to information of the different sub-bands. The corresponding relationship here may also be pre-determined by the network side and the terminal (such as through protocol agreement), or indicated by the network side through the signaling, such as through the RRC signaling, or pre-indicated to the terminal through the MAC signaling and the like.

Optionally, the corresponding relationship between the band width of the CC corresponding to the uplink signal and the information of the at least one sub-band in the frequency-domain resource may be expressed in a table form.

For example, illustration is made by taking an example that the information of the at least one sub-band is the number of the sub-bands. Table 5 is a corresponding relationship table of the band width of the CC and the number of the sub-bands.

TABLE 5

| The band width $N_{cc}$ of the CC (PRB number) | The number of the sub-bands |
|---|---|
| $N_2 < N_{cc} \leq N_1$ | $M_1$ |
| $N_3 < N_{cc} \leq N_2$ | $M_2$ |
| ... | ... |
| $N_{cc} \leq N_s$ | $M_s$ |

Where, $N_1, N_2, \ldots, N_s, M_1, M_2, \ldots, M_s$, and s are positive integers. The corresponding relationship between the band width of the CC corresponding to the uplink signal and the number of the sub-bands contained in Table 5 may be indicated by the network side to the terminal, or be pre-determined by the terminal and the network side.

For another example, illustration is made by taking an example that the information of the at least one sub-band is the band width of the sub-band: Table 6 is a corresponding relationship table of the band width of the CC and the band width of the sub-band.

TABLE 6

| The band width $N_{cc}$ of the CC (PRB number) | The band width of the sub-band (PRB number) |
|---|---|
| $N_2 < N_{cc} \leq N_1$ | $L_1$ |
| $N_3 < N_{CC} \leq N_2$ | $L_2$ |
| ... | ... |
| $N_{cc} \leq N_s$ | $L_s$ |

Where, $N_1, N_2, \ldots, L_s, L_1, L_2, \ldots, L_s$, and s are positive integers. The corresponding relationship between the band width of the frequency-domain CC and the band width of the sub-band contained in Table 6 may be indicated by the network side to the terminal, or be pre-determined by the terminal and the network side.

Optionally, the terminal may further determine the band width of the sub-band according to the number of the sub-bands. For example, the band width of the sub-band is: $N_{cc} - M_i \lfloor N_{cc}/M_i \rfloor$ in one sub-band, and is $\lfloor N_{cc}/M_i \rfloor$ in other sub-bands, where $M_i$ is the number of the sub-bands corresponding to the band width of the frequency-domain CC.

Optionally, the network side and the terminal may determine the certain corresponding relationship between the band width of the CC corresponding to the uplink signal and the number of the sub-bands through a protocol. Each band width of the CC corresponds to one or more multiple quantities, when the certain band width of the CC corresponds to multiple sub-band quantities, the network side may indicate the number of sub-bands during the actual transmission of the uplink signal to the terminal through the signaling. For example, when the band width of the CC is $N_2<N_{BWP}\leq N_1$, a value of the number of sub-bands may be X and Y, and thus the network side may indicate the UE to use the number of sub-bands X or Y during actual transmission of the uplink signal through the signaling.

Optionally, the network side and the terminal may determine the certain corresponding relationship between the band width of the CC corresponding to the uplink signal and the band width of the sub-band through a protocol. Each band width of the CC corresponds to one or more sub-band band widths, when the certain band width of the CC corresponds to the plurality of sub-band band widths, the network side may indicate the sub-band band width during the actual transmission of the uplink signal to the terminal through the signaling.

In the embodiment of the present disclosure, the method for determining the information of the at least one sub-band in the frequency-domain resource according to the transmission parameter is similar to the aforementioned method for determining the information of the at least one sub-band in the frequency-domain resource according to the parameter information of the frequency-domain resource, and the specific implementation steps may be performed by referring to how to determine the information of the at least one sub-band in the frequency-domain resource according to the parameter information of the frequency-domain resource in the aforementioned embodiment, which is not repeated here.

In one embodiment, the determining the information of the at least one sub-band in the frequency-domain resource includes: the number of pieces and/or overhead of the indication information of the information of the at least one sub-band in the frequency-domain resource are/is determined.

Then, how to determine the number of pieces and/or overhead of the indication information for the information of the at least one sub-band for the transmission of the uplink signal is explained and illustrated.

In one embodiment, the determining the number of pieces and/or overhead of the indication information for the information of the at least one sub-band for the transmission of the uplink signal according to the transmission parameter and/or the parameter information of the frequency-domain resource includes: the number of pieces and/or overhead of the indication information for the information of the at least one sub-band for the transmission of the uplink signal are/is determined according to the transmission parameter and/or the parameter information of the frequency-domain resource and a second corresponding relationship between the transmission parameter and/or the parameter information of the frequency-domain resource and the overhead of the indication information for the information of the at least one sub-band. The second corresponding relationship is indicated by the network side through the signaling or is pre-determined by the terminal and the network side.

Optionally, the determining the overhead of the indication information for the information of the at least one sub-band for the transmission of the uplink signal includes: an overhead of the indication information corresponding to each sub-band in the at least one sub-band for the transmission of the uplink signal are determined; and/or, an overhead of the indication information for the at least one sub-band for the transmission of the uplink signal is determined. In other words, the overhead of the indication information for the information of the at least one sub-band here may be a sum of the overhead of the indication information for all the sub-bands, or the overhead of the indication information for the single sub-band, or a sum of the overhead of the indication information for some sub-bands in the indication information for all the sub-bands. Optionally, each sub-band corresponds to one piece of indication information for the sub-band.

Optionally, the indication information includes at least one of the following items: indication information for a precoding matrix, indication information for a number of transmission layers, spatial related information, indication information for an uplink sounding reference signal resource, indication information for a transmission antenna or indication information for an antenna panel. It should be noted that these information may be independently coded or jointly coded. For example, the indication information for the uplink sounding reference signal resource and the indication information for the number of transmission layers are jointly coded. For another example, the precoding matrix indication information and the indication information for the number of transmission layers are jointly coded.

How to determine the number of pieces and/or overhead of the indication information for the information of the at least one sub-band for the transmission of the uplink signal is illustrated below aiming at the parameter information of each frequency-domain resource and each transmission parameter.

Firstly, how to determine the number of pieces and/or overhead of the indication information for the information of the at least one sub-band for the transmission of the uplink signal according to the parameter information of the frequency-domain resource is exemplified.

Embodiment 4

The parameter information of the frequency-domain resource is a band width of a BWP corresponding to the uplink signal.

The band width of the BWP corresponding to the uplink signal here may be a band width of the BWP where an uplink signal is transmitted, such as a band width of the BWP where a signal on the PUSCH is transmitted. Or, the band width of the BWP corresponding to the uplink signal here may be the band width of ULBWP being activated when the uplink signal is scheduled by the network side. For example, the uplink signal is scheduled by the network side (such as the PUSCH signal) through the DCI format 0_1 signaling. When the network side sends the DCI format 0_1 signaling to the terminal, a pair of uplink BWP and downlink BWP may be activated at the same time. The activated downlink BWP bears the DCI format 0_1 signaling, while the band width of the activated uplink BWP is the band width of the BWP corresponding to the uplink signal. Or, the band width of the BWP corresponding to the uplink signal here may be a maximum value of band widths of all the UL BWPs configured by a carrier where the uplink signal is transmitted. For example, a carrier where the PUSCH signal is transmitted configured with the plurality of UL BWPs, wherein the band width sizes of the plurality of UL BWPs may be the same or different, while the band width of the BWP corresponding to the PUSCH signal may be the maximum value (it may be any UL BWP band width if the band width sizes of the plurality of UL BWPs are the same) of the band widths of the plurality of above UL BWPs.

Optionally, the terminal may determine the number of pieces and/or overhead of the indication information for the information of the at least one sub-band for the transmission of the uplink signal according to the band width of the BWP corresponding to the uplink signal and the corresponding relationship (a second corresponding relationship) between the band width of the BWP corresponding to the uplink signal and the number of pieces and/or overhead of the indication information for the information of the at least one sub-band for the transmission of the uplink signal. The corresponding relationship here may be pre-determined (such as protocol agreement) by the network side and the terminal, or be indicated by the network side through the signaling, such as through the RRC signaling, or be pre-indicated to the terminal through the MAC signaling and the like. For example, taking an example that the indication information for the information of the sub-band is the precoding matrix indication information of the sub-band for the purpose of determining the overhead of the precoding matrix indication information of the sub-band. It is assumed that the network side pre-indicates the corresponding relationship to the terminal through the RRC signaling. When the band width of the BWP corresponding to the PUSCH signal is N PRBs, the overhead of the precoding matrix indication information corresponding to the sub-band is M bits, and N and M are both positive integers. If the terminal determines that the band width of the BWP corresponding to the PUSCH signal is N PRBs, it may be determined again that the overhead of the precoding matrix indication information of the sub-band is M bits according to the corresponding relationship pre-indicated by the network side.

Further, the band width of the BWP corresponding to the uplink signal may be divided into the different ranges. As for the BWP falling in the specific band width range, the information of at least one the sub-band may be known in advance. In other words, the corresponding relationship between the band width of the BWP and the number of pieces and/or overhead of the indication information for the information of the at least one sub-band for the transmission of the uplink signal may be that: the BWPs with the different band width ranges correspond to the different quantities and/or an overhead of the indication information for the information of the at least one sub-band for the transmission of the uplink signal, the corresponding relationship here may also be pre-determined by the network side and the terminal (such as through protocol agreement), or indicated by the network side through the signaling, such as through the RRC signaling, or pre-indicated to the terminal through the MAC signaling and the like.

Optionally, the corresponding relationship between the band width of the BWP corresponding to the uplink signal and the number of pieces and/or overhead of the indication information for the information of the at least one sub-band for the transmission of the uplink signal may be expressed in a table form.

For example, illustration is made by taking an example that the indication information for the information of the at least one sub-band is the precoding matrix indication information of the sub-band. Table 7 is a corresponding relationship table of the band width of the BWP and the overhead of the precoding matrix indication information of the sub-band.

TABLE 7

| The band width $N_{BWP}$ of the BWP (PRB number) | The overhead of the precoding matrix indication information of the sub-band (Bit number) |
|---|---|
| $N_2 < N_{BWP} \leq N_1$ | $M_1$ |
| $N_3 < N_{BWP} \leq N_2$ | $M_2$ |
| ... | ... |
| $N_{BWP} \leq N_s$ | $M_s$ |

Where, $N_1, N_2, \ldots, N_s, M_1, M_2, \ldots M_s$, and s are positive integers. The corresponding relationship between the band width of the BWP corresponding to the uplink signal and the overhead of the precoding matrix indication information of the sub-band contained in Table 7 may be indicated by the network side to the terminal, or be pre-determined by the terminal and the network side.

Similarly, the number of pieces of the indication information for the information of the sub-band may also be determined according to the corresponding relationship table of the band width of the BWP and the number of pieces of the precoding matrix indication information of the at least one sub-band, and the corresponding table is not listed here.

Optionally, the terminal may further determine the overhead of the indication information for the information of the sub-band of the single sub-band according to the number of pieces of the indication information for the information of the sub-band. For example, the terminal determines that the overhead of the indication information for the information of the sub-band is M bits, the number of pieces of the indication information for the information of the sub-band is N, and thus the overhead of the indication information for the information of the single sub-band is M/N.

Optionally, the corresponding relationship between the band width of the BWP corresponding to the uplink signal and the overhead of the indication information for the information of the at least one sub-band for the transmission of the uplink signal may also be: the corresponding relationship between the band width of the BWP corresponding to the uplink signal and the overhead of the indication information for the information of the single sub-band for the transmission of the uplink signal.

For example, Table 8 is a corresponding relationship table of the band width of the BWP and the overhead of the precoding matrix indication information of the single sub-band.

TABLE 8

| The band width $N_{BWP}$ of the BWP (PRB number) | The overhead of the precoding matrix indication information of the single sub-band (bit number) |
|---|---|
| $N_2 < N_{BWP} \leq N_1$ | $L_1$ |
| $N_3 < N_{BWP} \leq N_2$ | $L_2$ |
| ... | ... |
| $N_{BWP} \leq N_s$ | $L_s$ |

Where, $N_1, N_2, \ldots, N_s, L_1, L_2, \ldots, L_s$, and s are positive integers. The corresponding relationship between the band width of the BWP corresponding to the uplink signal and the overhead of the precoding matrix indication information of the single sub-band contained in Table 8 may be indicated by the network side to the terminal, or be pre-determined by the terminal and the network side.

Optionally, the network side and the terminal may determine the certain corresponding relationship between the band width of the BWP corresponding to the uplink signal and the number of pieces of the indication information for the information of the sub-band through a protocol. Each BWP band width range corresponds to the number of pieces of the indication information for the information of one or more sub-bands, when the certain band width range of the BWP corresponds to the number of pieces of the indication information for the information of the plurality of sub-bands, the network side may indicate the number of pieces of the indication information for the information of the sub-band for the transmission of the uplink signal to the terminal through the signaling. For example, when the band width range of the BWP is $N_2 < N_{BWP} \leq N_1$, a value of the number of pieces of the indication information for the information of the sub-band may be X and Y, and thus the network side may indicate whether the number of pieces of the indication information for the information of the sub-band is X or Y during actual transmission of the uplink signal of UE through the signaling.

Optionally, the network side and the terminal may determine the certain corresponding relationship between the band width of the BWP corresponding to the uplink signal and the overhead of the indication information for the information of the sub-band through a protocol. Each BWP band width range corresponds to the overhead of the indication information for the information of one or more sub-bands, when the certain band width range of the BWP corresponds to the overhead of the indication information for the information of the plurality of sub-bands, the network side may indicate the overhead of the indication information for the information of the sub-band during the actual transmission of the uplink signal to the terminal through the signaling.

Embodiment 5

The parameter information of the frequency-domain resource is a resource range of RA corresponding to the uplink signal.

The RA corresponding to the uplink signal here may be a frequency-domain resource configured or allocated by the network side for the uplink signal, and the terminal transmits the uplink signal on these frequency-domain resources. The RA may be all or partial resource blocks (RB) of one uplink carrier allocated by the network side for the uplink signal, or all or partial RBs in one uplink BWP allocated by the network for the uplink signal.

Optionally, the terminal may determine the number of pieces and/or overhead of the indication information for the information of the at least one sub-band for the transmission of the uplink signal according to the resource range of the RA and the corresponding relationship (a second corresponding relationship) between the resource range of the RA and the number of pieces and/or overhead of the indication information for the information of the at least one sub-band for the transmission of the uplink signal. The corresponding relationship here may be pre-determined (such as through protocol agreement) by the network side and the terminal, or be indicated by the network side through the signaling, such as through the RRC signaling, or be pre-indicated to the terminal through the MAC signaling and the like. For example, taking an example that the indication information for the information of the sub-band is the precoding matrix indication information of the sub-band for the purpose of determining the overhead of the precoding matrix indication information of the sub-band, it is assumed that the network side pre-indicates the corresponding relationship to the terminal through the RRC signaling: when the resource range of the RA is N PRBs, the overhead of the precoding matrix indication information corresponding to the sub-band is M bits, and N and M are both positive integers. If the terminal determines that the resource range of the frequency-domain RA is N PRBs, it may be determined again that the overhead of the precoding matrix indication information of the corresponding sub-band is M bits according to the corresponding relationship pre-indicated by the network side.

Further, the resource range of the RA may be divided into some different ranges. As for the resource range of the RA falling in the specific range, the number of pieces and/or overhead of the indication information for the information of the sub-band may be known in advance. In other words, the corresponding relationship between the resource range of the RA and the number of pieces and/or overhead of the indication information for the information of the sub-band may be: the different resource ranges of the RA correspond to the different quantities and/or an overhead of the indication information for the information of the sub-band, the corresponding relationship here may also be pre-determined by the network side and the terminal (such as protocol agreement), or indicated by the network side through the signaling, such as through the RRC signaling, or pre-indicated to the terminal through the MAC signaling and the like.

Optionally, the corresponding relationship between the resource range of the RA and the number of pieces and/or overhead of the indication information for the information of the at least one sub-band for the transmission of the uplink signal may be expressed in a table form.

For example, illustration is made by taking an example that the indication information for the information of the sub-band is the precoding matrix indication information of the sub-band. Table 9 is a corresponding relationship table of the resource range of the RA and the overhead of the precoding matrix indication information of the sub-band.

TABLE 9

| The resource range $N_{RA}$ of the RA (PRB number) | The overhead of the precoding matrix indication information of the sub-band (Bit number) |
|---|---|
| $N_2 < N_{RA} \leq N_1$ | $M_1$ |
| $N_3 < N_{RA} \leq N_2$ | $M_2$ |
| ... | ... |
| $N_{RA} \leq N_s$ | $M_s$ |

Where, $N_1, N_2, \ldots, N_s, M_1, M_2, \ldots, M_s$, and s are positive integers. The corresponding relationship between the resource range of the RA and the overhead of the precoding matrix indication information of the sub-band contained in Table 9 may be indicated by the network side to the terminal, or be pre-determined by the terminal and the network side.

Similarly, the number of pieces of the indication information for the information of the sub-band may also be determined according to the corresponding relationship table of the resource range of the RA and the number of pieces of the precoding matrix indication information of the at least one sub-band, and the corresponding table is not listed here.

Optionally, the terminal may further determine the overhead of the indication information for the information of the sub-band of the single sub-band according to the number of pieces of the indication information for the information of the sub-band. For example, the terminal determines that the overhead of the indication information for the information of the sub-band is M bits, the number of pieces of the indication information for the information of the sub-band is N, and thus the overhead of the indication information for the information of the single sub-band is M/N.

Optionally, the corresponding relationship between the resource range of the RA and the overhead of the indication information for the information of the at least one sub-band for the transmission of the uplink signal may also be: the corresponding relationship between the resource range of the RA and the overhead of the indication information for the information of the single sub-band for the transmission of the uplink signal.

For example, Table 10 is a corresponding relationship table of the resource range of the RA and the overhead of the precoding matrix indication information of the single sub-band.

TABLE 10

| The resource range $N_{RA}$ of the frequency-domain RA (PRB number) | The overhead of the precoding matrix indication information of the single sub-band (bit number) |
|---|---|
| $N_2 < N_{RA} \leq N_1$ | $L_1$ |
| ... | ... |
| $N_{RA} \leq N_s$ | $L_s$ |

Where, $N_1, N_2, \ldots, N_s, L_1, L_2, \ldots, L_s$, and s are positive integers. The corresponding relationship between the resource range of the RA and the overhead of the precoding matrix indication information of the single sub-band contained in Table 10 may be indicated by the network side to the terminal, or be pre-determined by the terminal and the network side.

Optionally, the network side and the terminal may determine the certain corresponding relationship between the resource range of the RA corresponding to the uplink signal and the number of pieces of the indication information for the information of the sub-band through a protocol. Each resource range of the RA corresponds to the number of pieces of the indication information for the information of one or more sub-bands. When the certain resource range of the RA corresponds to the number of pieces of the indication information for the information of the plurality of sub-bands, the network side may indicate the number of pieces of the indication information for the information of the sub-band for the transmission of the uplink signal to the terminal through the signaling. For example, when the resource range of the RA is $N_2 < N_{BWP} \leq N_1$, a value of the number of pieces of the indication information for the information of the sub-band may be X and Y, and thus the network side may indicate whether the number of pieces of the indication information for the information of the sub-band is X or Y during actual transmission of the uplink signal of UE through the signaling.

Optionally, the network side and the terminal may determine the certain corresponding relationship between the resource range of the RA corresponding to the uplink signal and the overhead of the indication information for the information of the sub-band through a protocol. Each resource range of the RA corresponds to the overhead of the indication information for the information of one or more sub-bands. When the certain resource range of the RA corresponds to the overhead of the indication information for the information of the plurality of sub-bands, the network side may indicate the overhead of the indication information for the information of the sub-band during the actual transmission of the uplink signal to the terminal through the signaling.

Embodiment 6

The parameter information of the frequency-domain resource is a band width of the CC corresponding to the uplink signal.

The band width of the CC corresponding to the uplink signal here may be a band width of the CC where an uplink signal is transmitted, such as a band width of the CC where a signal on the PUSCH is transmitted. Or, the band width of the CC corresponding to the uplink signal here may be a band width of UL CC activated when the uplink signal is scheduled by the network side. For example, the uplink signal is scheduled by the network side (such as the PUSCH signal) through a DCI format 0_1 signaling. When the network side sends the DCI format 0_1 signaling to the terminal, uplink CC and downlink CC may be activated at the same time, wherein the activated downlink CC bears the DCI format 0_1 signaling, while the band width of the activated uplink CC is the band width of the CC corresponding to the uplink signal. Or, the band width of the CC corresponding to the uplink signal here may be a maximum value of the values of all the uplink CCs configured in a CC aggregation for the transmission of the uplink signal. For example, a PUSCH signal transmission CC aggregation is configured with the plurality of uplink CCs, wherein the band width sizes of the plurality of uplink CCs may be the same or different, while the band width of the CC corresponding to the PUSCH signal may be the maximum value (it may be the band width of any uplink CC if the band width sizes of the plurality of uplink CCs are the same) of the band widths of the plurality of above uplink CCs.

Optionally, the terminal may determine the number of pieces and/or overhead of the indication information for the information of the at least one sub-band for the transmission of the uplink signal according to the band width of the CC corresponding to the uplink signal and the corresponding relationship (the second corresponding relationship) between the band width of the CC corresponding to the uplink signal and the number of pieces and/or overhead of the indication information for the information of the at least one sub-band for the transmission of the uplink signal. The corresponding relationship here may be pre-determined (such as through protocol agreement) by the network side and the terminal, or be indicated by the network side through the signaling, such as through the RRC signaling, or be pre-indicated to the terminal in advance through the MAC signaling and the like. For example, taking an example that the indication information for the information of the sub-band is the precoding matrix indication information of the sub-band for the purpose of determining the overhead of the precoding matrix indication information of the sub-band, it is assumed that the network side pre-indicates the corresponding relationship to the terminal through the RRC signaling: when the band width of the CC is N PRBs, the overhead of the precoding matrix indication information corresponding to the sub-band is M bits, and N and M are both positive integers. If the terminal determines that the band width of the CC is N PRBs, it may be determined again that the overhead of the precoding matrix indication information corresponding to the sub-band is M bits according to the corresponding relationship pre-indicated by the network side.

Further, the band width of the CC may be divided into some different ranges. As for the band width of the CC falling in the specific range, the number of pieces and/or overhead of the indication information for the information of the sub-band may be known in advance. In other words, the corresponding relationship between the band width of the CC and the number of pieces and/or overhead of the indication information for the information of the sub-band may be: the different band widths of the CC correspond to the different quantities and/or an overhead of the indication information for the information of the sub-band, the corresponding relationship here may also be pre-determined by the network side and the terminal (such as protocol agreement), or indicated by the network side through the signaling, such as through the RRC signaling, or pre-indicated to the terminal through the MAC signaling and the like.

Optionally, the corresponding relationship between the band width of the CC and the number of pieces and/or overhead of the indication information for the information of the at least one sub-band for the transmission of the uplink signal may be expressed in a table form.

For example, illustration is made by taking an example that the indication information for the information of the sub-band is the precoding matrix indication information of the sub-band. Table 11 is a corresponding relationship table of the band width of the CC and the overhead of the precoding matrix indication information of the sub-band.

TABLE 11

| The band width $N_{cc}$ of the CC (PRB number) | The overhead of the precoding matrix indication information of the sub-band (Bit number) |
| --- | --- |
| $N_2 < N_{RA} \leq N_1$ | $M_1$ |
| $N_3 < N_{RA} \leq N_2$ | $M_2$ |
| ... | ... |
| $N_{RA} \leq N_s$ | $M_s$ |

Where, $N_1, N_2, \ldots, N_s, M_1, M_2, \ldots, M_s$, and s are positive integers. The corresponding relationship between the band width of the CC and the overhead of the precoding matrix indication information of the sub-band contained in Table 11 may be indicated by the network side to the terminal, or be pre-determined by the terminal and the network side.

Similarly, the number of pieces of the indication information for the information of the sub-band may also be determined according to the corresponding relationship table of the band width of the CC and the number of pieces of the precoding matrix indication information of the at least one sub-band, and the corresponding table is not listed here.

Optionally, the terminal may further determine the overhead of the indication information for the information of the sub-band of the single sub-band according to the number of pieces of the indication information for the information of the sub-band. For example, the terminal determines that the overhead of the indication information for the information of the sub-band is M bits, the number of pieces of the indication information for the information of the sub-band is N, and thus the overhead of the indication information for the information of the single sub-band is M/N.

Optionally, a corresponding relationship between the band width of the CC and the overhead of the indication information for the information of the at least one sub-band for the transmission of the uplink signal may also be: the corresponding relationship between the band width of the CC and the overhead of the indication information for the information of the single sub-band for the transmission of the uplink signal.

For example, Table 12 is a corresponding relationship table of the band width of the CC and the overhead of the precoding matrix indication information of the single sub-band.

TABLE 12

| The band width $N_{cc}$ of the CC (PRB number) | The overhead of the precoding matrix indication information of the single sub-band (bit number) |
| --- | --- |
| $N_2 < N_{RA} \leq N_1$ | $L_1$ |
| ... | ... |
| $N_{RA} \leq N_s$ | $L_s$ |

Where, $N_1, N_2, \ldots, N_s, L_1, L_2, \ldots, L_s$, and s are positive integers. The corresponding relationship between the band width of the CC and the overhead of the precoding matrix indication information of the single sub-band contained in Table 12 may be indicated by the network side to the terminal, or be pre-determined by the terminal and the network side.

Optionally, the network side and the terminal may determine the certain corresponding relationship between the band width of the CC corresponding to the uplink signal and the number of pieces of the indication information for the information of the sub-band through a protocol. Each band width of the CC corresponds to the number of pieces of the indication information for the information of one or more sub-bands. When the certain band width of the CC corresponds to the number of pieces of the indication information for the information of the plurality of sub-bands, the network side may indicate the number of pieces of the indication information for the information of the sub-band for the transmission of the uplink signal to the terminal through the signaling. For example, when the band width of the CC is $N_2 < N_{BWP} \leq N_1$, a value of the number of pieces of the indication information for the information of the sub-band may be X and Y, and thus the network side may indicate whether the number of pieces of the indication information for the information of the sub-band is X or Y during actual transmission of the uplink signal of UE through the signaling.

Optionally, the network side and the terminal may determine the certain corresponding relationship between the band width of the CC corresponding to the uplink signal and the overhead of the indication information for the information of the sub-band through a protocol. Each band width of the CC corresponds to the overhead of the indication information for the information of one or more sub-bands. When the certain band width of the BWP corresponds to the overhead of the indication information for the information of the plurality of sub-bands, the network side may indicate the overhead of the indication information for the information of the sub-band during the actual transmission of the uplink signal to the terminal through the signaling.

In one embodiment, the determining the information of the at least one sub-band in the frequency-domain resource includes: the number of pieces and/or overhead of the indication information for the information of the at least one sub-band in the frequency-domain resource are/is determined.

Then how to determine the number of pieces and/or overhead of the indication information for the information of the at least one sub-band for the transmission of the uplink signal according to the transmission parameter is exemplified.

Embodiment 7

The transmission parameter is a codebook subset parameter sent by the network side.

The codebook subset parameter may be a restriction signaling of a codebook subset sub-band indicated by the network side. The overhead of the indication information for the information of the sub-band may be associated with the restriction signaling of the codebook subset indicated by the network side. In other words, the terminal may determine the overhead of the indication information for the information of the sub-band according to the codebook subset indicated by the network side. Specifically, the overhead of the indication information for the information of the sub-band may be determined according to restriction of the codebook subset restriction signaling indicated by the network side to a codebook subset of the uplink signal.

An example is given by taking an example that the indication information for the information of the sub-band is the precoding matrix indication information of the sub-band: if the codebook subset restriction signaling indicated by the network side is "nonCoherent", a bit width of the precoding matrix indication information of the sub-band is 2 bits; and if the codebook subset restriction signaling indicated by the network side is "partialAndNonCoherent", a bit width of the precoding matrix indication information of the sub-band is 3 bits.

Embodiment 8

The transmission parameter is SRS resource information.

The SRS resource information here may include a number of antenna ports of y an SRS resource in an SRS resource set with a usage which is consistent with a transmission mode of PUSCH, and/or, a number of antenna ports of an SRS resource in an SRS resource set indicated by the network side, and/or, a number of antenna ports of an SRS resource indicated by the network side.

It may be concluded from the last paragraph of content that: the overhead of the indication information for the information of the sub-band may be associated with the number of the antenna ports of the SRS resource. In other words, the terminal may determine the overhead of the indication information for the information of the sub-band according to the number of the antenna ports of the SRS resource. The different SRS resource information is illustrated below in detail.

1. When the SRS resource information is the number of the antenna ports of the SRS resource in the SRS resource set with a usage which is consistent with a transmission mode of PUSCH, the overhead of the indication information for the information of the sub-band may be associated with the number of the antenna ports of the SRS resource in the SRS resource set with a usage which is consistent with a transmission mode of PUSCH.

Further, the terminal may determine the overhead of the indication information for the information of the at least one sub-band for the transmission of the uplink signal according to a maximum number of the antenna ports of the SRS resource in the SRS resource set with a usage which is consistent with the transmission mode of the uplink signal, which may be divided into the following cases here.

Case 1: the SRS resource set only includes one SRS resource.

An example is given by taking an example that the indication information for the information of the sub-band is the precoding matrix indication information of the sub-band. If a high-level signaling usage is configured that the SRS resource set of 'codebook' only has one SRS resource, the overhead of the precoding matrix indication information of the sub-band is determined according to a number of antenna ports of an SRS resource in this SRS resource when the terminal performs the transmission of the uplink signal. For example, if the number of the antenna ports of this SRS resource is 2, the overhead of the precoding matrix indication information of one sub-band may be determined as 1 bit; and if the number of the antenna ports of this SRS resource is 2, the overhead of the precoding matrix indication information of one sub-band may be determined as 2 bits.

Case 2: the SRS resource set includes two or more SRS resources, and these SRS resources contain the same number of antenna ports.

An example is given by taking an example that the indication information for the information of the sub-band is the precoding matrix indication information of the sub-band. If the high-level signaling usage is configured that the SRS resource set of 'codebook' contains the plurality of SRS resources and the antenna port quantities of all the SRS resources are the same, the overhead of the precoding matrix indication information of one sub-band is determined according to this same number of antenna ports when the terminal performs the transmission of the uplink signal.

Case 3: the SRS resource set includes two or more SRS resources, and these SRS resources contain the different antenna port quantities.

An example is given by taking an example that the indication information for the information of the sub-band is the precoding matrix indication information of the sub-band. In the condition that the high-level signaling usage is configured that the SRS resource set of 'codebook' contains two SRS resources, the number of the antenna ports of the first SRS resource is 2, and the number of the antenna ports of the second SRS resource set is 4, the overhead of the precoding matrix indication information of one sub-band may be determined according to the number of antenna ports of max {2, 4}=4 when the terminal performs the transmission of the uplink signal.

2, When the SRS resource information is the number of the antenna ports of the SRS resource in the SRS resource set indicated by the network side, the overhead of the indication information for the information of the sub-band may be associated with the number of the antenna ports of the SRS resource in the SRS resource set indicated by the network side.

Further, the terminal may determine the overhead of the indication information for the information of the at least one sub-band for the transmission of the uplink signal according to a maximum number of the antenna ports of at least one SRS resource in the SRS resource set indicated by the network side. Similar to the case that the SRS resource information is the number of the antenna ports of the SRS resource in the SRS resource set consistent with the transmission mode of the PUSCH in usage, it may be implemented in three cases according to the different numbers of the SRS resources included in the SRS resource set. The specific implementation steps may be performed by referring to the aforementioned embodiments, which is not repeated here.

3, When the SRS resource information is the number of the antenna ports of the SRS resource indicated by the network side, the overhead of the indication information for the information of the sub-band may be associated with the number of the antenna ports of the SRS resource indicated by the network side. In other words, the terminal may determine the overhead of the indication information for the information of the at least one sub-band for the transmission of the uplink signal according to the number of the antenna ports of the SRS resource indicated by the network side.

An example is given by taking an example that the indication information for the information of the sub-band is the precoding matrix indication information of the sub-band. If the high-level signaling indicates that the number of the antenna ports of one SRS resource is 2, the overhead of the precoding matrix indication information of one sub-band may be determined as 1 bit.

Embodiment 9

The transmission parameter is the information of the number of transmission layers.

The overhead of the indication information for the information of the sub-band may be associated with the information of the number of transmission layers. In other words, the terminal may determine the overhead of the indication information for the information of the sub-band according to the information of the number of transmission layers.

Further, the information of the number of transmission layers may be a maximum number of transmission layers for the transmission of the uplink signal, and the overhead of the indication information for the information of the sub-band may be associated with the maximum number of transmission layers for the transmission of the uplink signal. In other words, the terminal may determine the overhead of the indication information for the information of the sub-band according to the maximum number of transmission layers for the transmission of the uplink signal.

The maximum number of transmission layers for the transmission of the uplink signal here may be the maximum number of transmission layers determined by any of the following cases.

Case 1 is a maximum number of transmission layers corresponding to a transmission mode of the uplink signal supported by a terminal, e.g., a maximum number of transmission layers of the PUSCH, under the PUSCH transmission mode, indicated by capability indication information reported by the terminal.

Case 2 is a maximum number of transmission layers corresponding to the transmission mode of the uplink signal configured by the network side for the terminal.

Case 3 is a smaller value of a number of transmission layers corresponding to the transmission mode of the uplink signal supported by the terminal and a maximum number of transmission layers corresponding to the transmission mode of the uplink signal configured by the network side for the terminal.

Case 4 is a minimum value among a number of antenna ports of an SRS resource corresponding to the transmission mode of the uplink signal, a maximum number of transmission layers corresponding to the transmission mode of the uplink signal supported by a terminal and a maximum number of transmission layers corresponding to the transmission mode of the uplink signal configured by the network side for the terminal.

Case 5 is a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal.

Case 6 is a smaller value of a number of antenna ports of an SRS resource under a transmission mode of the uplink signal and a maximum number of transmission layers corresponding to a transmission mode of the uplink signal supported by a terminal.

Case 7 is a smaller value of a number of antenna ports of an SRS resource indicated by the network side and a maximum number of transmission layers corresponding to a transmission mode of the uplink signal supported by a terminal.

Case 8 is a smaller value of a number of antenna ports of an SRS resource under a transmission mode of the uplink signal and a maximum number of transmission layers corresponding to a transmission mode of the uplink signal configured by the network side for a terminal.

Case 9 is a smaller value of a number of antenna ports of an SRS resource indicated by the network side and a maximum number of transmission layers corresponding to a transmission mode of the uplink signal configured by the network side for a terminal.

Embodiment 10

The transmission parameter is whether the uplink signal is transmitted with full power.

The overhead of the indication information for the information of the sub-band may be associated with whether the uplink signal is transmitted with full power. In other words, the terminal may determine the overhead of the indication information for the information of the sub-band according to whether the uplink signal is transmitted with full power.

Embodiment 11

The transmission parameter is a full-power transmission mode of the uplink signal.

The overhead of the indication information for the information of the sub-band may be associated with the full-power transmission mode of the uplink signal. In other words, the terminal may determine the overhead of the indication information for the information of the sub-band according to the full-power transmission mode of the uplink signal. For example, a full-power transmission mode corresponding to PUSCH signal transmission includes a mode 1 and a mode 2. It is assumed that the full-power transmission mode indicated by the network side is the mode 2, the terminal may determine the overhead of the indication information for the information of the sub-band according to the mode 2 indicated by the network side.

Embodiment 12

The transmission parameter is a transmission mode of the uplink signal.

The overhead of the indication information for the information of the sub-band may be associated with the transmission mode of the uplink signal. In other words, the terminal may determine the overhead of the indication information for the information of the sub-band according to the transmission mode of the uplink signal. The transmission mode of the uplink signal here may include a codebook-based transmission mode, a non-codebook transmission mode, and some transmission modes except this.

Optionally, the determining the overhead of the indication information for the information of the sub-band may be determined according to any two transmission parameters or a combination of the plurality of any transmission parameters in Embodiment 7 to Embodiment 12. For example, when the number of layers of the transmission of the uplink signal is 1, the number of antenna ports of the SRS resource indicated by the network side is 2, and the codebook subset restriction signaling of the PUSCH indicated by the network side is nonCoherent, it may be determined that the overhead of the precoding matrix indication information of the sub-band is 1 bit. For another example, when the number of layers of the transmission of the uplink signal is 2, the number of antenna ports of the SRS resource indicated by the network side is 2, and the codebook subset restriction signaling of the transmission of the uplink signal indicated by the network side is fullyAndnonCoherent, it may be determined that the overhead of the precoding matrix indication information of the sub-band is 2 bits.

Optionally, a total overhead of the indication information for the information of the sub-band sent by the network side to the terminal may be a numerical value pre-determined. For example, the total overhead pre-determined may be indicated to the terminal through the network side, or be pre-determined by the network side and the terminal. For example, the overhead of the indicator of the transmission precoding matrix of the sub-band is pre-determined to be 2 bits.

Further, the total overhead of the indication information for the information of the sub-band sent by the network side to the terminal may be a fixed value. Taking an example that the indication information for the information of the sub-band is the indicator of the transmission precoding matrix of the sub-band, if a product of the number of the sub-bands contained by the PUSCH and a bit width of the precoding matrix indicator of the sub-band is smaller than a numerical value of the number pre-determined, bit stuffing may be performed, so that the total bit number of the indicator of the precoding matrix is equal to the value pre-determined.

Similarly, the method for determining the number of pieces of the indication information for the information of the sub-band may be implemented by referring to the method for determining the overhead of the indication information for the information of the sub-band in Embodiment 4 to Embodiment 12, which is not repeated here.

According to the method provided by Embodiment 1 to Embodiment 12, the terminal or the network device may determine the information of the sub-band and/or determine the number of pieces and/or overhead of the indication information for the information of the sub-band according to the transmission parameter and/or the parameter information of the frequency-domain resource. Then the terminal may perform frequency selective precoding transmission on the uplink signal by using the determined sub-band information or the number of pieces and/or overhead of the indication information for the information of the sub-band, thereby improving the transmission performance of the uplink signal.

FIG. 3 is a schematic flow diagram of a communication method in an embodiment of the present disclosure. As shown in FIG. 3, the method may include the following steps.

Step 301: first information is obtained by a terminal, wherein the first information is configured to indicate information of at least one sub-band in a frequency-domain resource for the transmission of the uplink signal of the terminal, and/or, configured to indicate an overhead and/or number of pieces of indication information for the information of the at least one sub-band for the transmission of the uplink signal sent by a network side.

In one embodiment, the first information includes at least one of the following items: a configuration and/or indication information of a BWP corresponding to the uplink signal, a configuration and/or indication information of frequency-domain resource allocation (RA) corresponding to the uplink signal, and configuration and/or indication information of a component carrier corresponding to the uplink signal.

In one embodiment, the information of the sub-band includes at least one of the following items: a width of the sub-band, or the number of the sub-bands.

Optionally, the network side further sends TPMI of the sub-band to the terminal. The TPMI of the sub-band is configured to indicate a precoding matrix of the sub-band, and the number of the sub-bands and the number of the transmission precoding matrix indicators (TPMI) of the sub-bands are the same.

In one embodiment, the overhead of the indication information for the information of the at least one sub-band for the transmission of the uplink signal includes: an overhead of the indication information corresponding to each sub-band in the at least one sub-band for the transmission of the uplink signal; and/or, an overhead of the indication information for the at least one sub-band for the transmission of the uplink signal. Optionally, each sub-band corresponds to one indication information for the sub-band.

In one embodiment, the indication information includes at least one of the following items: indication information for a precoding matrix, indication information for a number of transmission layers, spatial related information, indication information for an uplink sounding reference signal resource, indication information for a transmission antenna or indication information for an antenna panel.

The implementation methods under the different categories of first information are elaborated below in detail through the specific embodiments.

Embodiment 13

The first information is the configuration and/or indication information of the BWP corresponding to the uplink signal.

The BWP corresponding to the uplink signal here may be a BWP where the uplink signal is transmitted, such as a BWP where a signal on the PUSCH is transmitted. Or, the BWP corresponding to the uplink signal here may be a UL BWP being activated when the uplink signal is scheduled by the network side. For example, the uplink signal (such as the PUSCH signal) is scheduled by the network side through a DCI format 0_1 signaling, when the network side sends the DCI format 0_1 signaling to the terminal, a pair of uplink BWP and downlink BWP may be activated at the same time, wherein the activated downlink BWP bears the DCI format 0_1 signaling, while the activated uplink BWP is the BWP corresponding to the uplink signal.

Optionally, the configuration and/or indication information of the BWP corresponding to the uplink signal may be configured to indicate the information of the at least one sub-band of the terminal and/or the overhead and/or number of pieces of the indication information for the information of the at least one sub-band. For example, the configuration and/or indication information of the BWP sent by the network side is configured to indicate the width of the sub-band and/or the number of the sub-bands and/or TPMI of the sub-band, and/or configured to indicate the overhead and/or number of pieces of the indication information for the information of the at least one sub-band.

Optionally, the configuration and/or indication information of the BWP corresponding to the uplink signal may include a corresponding relationship between the BWP and the information of the at least one sub-band and/or the overhead and/or number of pieces of the indication information for the information of the at least one sub-band. For example, the network side may send a band width of a sub-band and/or the number of the sub-bands corresponding to BWP index to the terminal. Or, the terminal receives a band width of a sub-band and/or the number of the sub-bands for activating the BWP sent by another terminal.

Optionally, the BWP configuration information is PUSCH-Config in an RRC signaling.

Optionally, the BWP configuration information is BWP-Uplink in the RRC signaling.

Optionally, the BWP configuration information is BWP-UplinkCommon in the RRC signaling.

Optionally, the BWP configuration information is BWP-UplinkDedicated in the RRC signaling.

Embodiment 14

The first information is the configuration and/or indication information of the RA corresponding to the uplink signal.

Optionally, the configuration and/or indication information of the RA may be configured to indicate the information of the at least one sub-band of the terminal and/or the overhead and/or number of pieces of the indication information for the information of the at least one sub-band. For example, the configuration and/or indication information of the RA sent by the network side is configured to indicate the width of the sub-band and/or the number of the sub-bands and/or the TPMI of the sub-band, and/or configured to indicate the overhead and/or number of pieces of the indication information for the information of the at least one sub-band.

Optionally, the configuration and/or indication information of the RA may include a corresponding relationship between a resource range of the RA and the information of the at least one sub-band and/or the overhead and/or number of pieces of the indication information for the information of the at least one sub-band. For example, the network side may send a band width of a sub-band and/or the number of the sub-bands corresponding to the resource range of the RA to the terminal.

Further, the terminal may determine the overhead and/or number of pieces of the indication information for the information of the at least one sub-band for the transmission of the uplink signal according to the configuration and/or indication information of the RA. Specifically, the terminal may determine a corresponding relationship between the sub-band and a PRB according to the number of the sub-bands and/or the width of the sub-band of the BWP, and then the terminal may determine that how many sub-bands to which the RA is mapped according to the configuration and/or indication information of the RA. The overhead of the indication information for the information of the sub-band is a function of the number of the sub-band to which the RA is mapped. For example, the overhead of the indication information for the information of the sub-band is X times of the number of the sub-band to which the RA is mapped, and X is the overhead of the indication information for the information of the sub-band of one sub-band.

For example, taking an example that the indication information for the information of the sub-band is the indicator of the precoding matrix of the sub-band, as shown in FIG. 4, a horizontal direction represents the scheduled frequency-domain resources (the plurality of PRBs) of the PUSCH, $TPMI_{sub\ 1}$, $TPMI_{sub\ 2}$, ..., $TPMI_{sub\ s}$ represent sub-band precoding indicated by the indicator of the precoding matrix of the sub-band, and their values may be the same of different. The precoding sub-band starts from a subcarrier 0 of BWP PRB 0, and the band width size of each sub-band is the same. The terminal determines the sub-band corresponding to the RA according to the configuration and/or indication information of the RA. In the present example, the RA is totally mapped to S sub-bands, S is a positive integer, and the configuration and/or indication information of the corresponding RA indicates that the number of the indicator of the precoding matrix of the sub-band is S. It is assumed that schedule information of the PUSCH only indicates the sub-band precoding of the scheduled frequency-domain resource, and an overhead of a sub-band precoding indication information domain is L times of the number of the sub-bands to which the RA is mapped (wherein L is an overhead of the sub-band precoding matrix indicator of the single sub-band), thus the overhead of the sub-band precoding matrix indicator is S*L. In the present example, the terminal can only determine the sub-band precoding of the PRB corresponding to the RA. The other example is that the terminal may determine sub-band precoding of all the PRBs of the sub-bands corresponding to the RA. As shown in FIG. 5.

Further, the configuration and/or indication information of the RA may include the number of the sub-bands contained in the RA allocated for the uplink signal, and the terminal may determine information of at least one precoding sub-band in the frequency-domain resource, and/or, determine the number of pieces and/or overhead of the indication information for the information of the at least one precoding sub-band for the transmission of the uplink signal according to the number of the sub-bands.

For example, the number of the precoding sub-bands may be the number of the sub-bands contained by the RA.

For another example, the number of indicators of the precoding matrixes of the sub-bands may be the number of the sub-bands contained by the RA.

For another example, when the number of the sub-bands contained in the RA is $N_{sub}$, and the total overhead of the sub-band precoding indicator is M bits, the overhead of the sub-band precoding indicator of the single sub-band is $\lfloor M/N_{sub} \rfloor$ bits.

Optionally, the number of the sub-bands contained by the RA may be divided into the different ranges. As for the number of the sub-bands contained by the RA falling in the specific range, the information of the precoding sub-band and/or the number of pieces and/or overhead of the indication information for the information of the precoding sub-band may be known in advance. In other words, a corresponding relationship between the number of the sub-bands contained in the RA and the information of the precoding sub-band and/or the number of pieces and/or overhead of the indication information for the information of the precoding sub-band may be: the different quantities of the sub-bands contained in the RA correspond to the different information of the precoding sub-band and/or the different numbers of pieces and/or an overhead of indication information for the information of the precoding sub-band. The corresponding relationship here may also be pre-determined by the network side and the terminal (such as protocol agreement), or indicated by the network side through the signaling, such as through the RRC signaling, or pre-indicated to the terminal through the MAC signaling and the like.

Optionally, the corresponding relationship between the number of the sub-bands contained by the RA and the information of the precoding sub-band and/or a number of pieces of and/or overhead of indication information for the information of the precoding sub-band may be expressed in a table form. Similarly, it may be implemented by referring to any table of tables 1-11, and the table is not listed here.

Embodiment 15

The first information is the configuration and/or indication information of the CC corresponding to the uplink signal.

The CC corresponding to the uplink signal here may be the CC where an uplink signal is transmitted, such as the CC where a signal on the PUSCH is transmitted. Or, the CC corresponding to the uplink signal here may be UL CC activated when the uplink signal is scheduled by the network side. For example, the uplink signal is scheduled by the network side (such as the PUSCH signal) through a DCI format 0_1 signaling, when the network side sends the DCI format 0_1 signaling to the terminal, the uplink CC and the downlink CC may be activated at the same time, wherein the activated downlink CC bears the DCI format 0_1 signaling, while the activated uplink CC is the CC corresponding to the uplink signal.

Optionally, the configuration and/or indication information of the CC corresponding to the uplink signal may be configured to indicate the information of the at least one sub-band of the terminal and/or the overhead and/or number of pieces of the indication information for the information of the at least one sub-band. For example, the configuration and/or indication information of the CC sent by the network side is configured to indicate the width of the sub-band and/or the number of the sub-bands and/or the TPMI of the sub-band, and/or configured to indicate the overhead and/or number of pieces of the indication information for the information of the at least one sub-band.

Optionally, the configuration and/or indication information of the CC corresponding to the uplink signal may include a corresponding relationship between the CC and the information of the at least one sub-band and/or the overhead and/or number of pieces of the indication information for the information of the at least one sub-band. For example, the terminal receives the band width of the sub-band and/or the number of the sub-bands corresponding to the CC sent by the network side. Or, the terminal receives the band width of the sub-band and/or the number of the sub-bands corresponding to the CC sent by another terminal.

As for Embodiment 1 to Embodiment 15, optionally, the terminal may further use the determined information of the sub-band to perform sub-band precoding and/or analog beam forming on the uplink signal and then send the uplink signal.

As for Embodiment 1 to Embodiment 15, optionally, the terminal may store the overhead of the indication information of the determined information of the sub-band, to be used when the terminal performs blind detection of a physical downlink control channel (PDCCH), and/or determines sub-band precoding of the uplink signal.

According to the method provided by Embodiment 13 to Embodiment 15, the terminal may determine the information of the sub-band, and/or determine the number of pieces and/or overhead of the indication information for the information of the sub-band according to indication of the indication information. Then the terminal may perform frequency selective precoding transmission on the uplink signal by using the determined information of the sub-band or the number of pieces and/or overhead of the indication information for the information of the sub-band, thereby improving the transmission performance of the uplink signal.

FIG. 6 is a schematic flow diagram of a communication method in an embodiment of the present disclosure. As shown in FIG. 6, the method may include the following steps.

Step 601: first information is sent by a network device, wherein the first information is configured to indicate information of at least one sub-band in an uplink frequency-domain resource of a terminal, and/or, configured to indicate an overhead and/or number of pieces of indication information for the information of the at least one sub-band for a transmission of the uplink signal of the terminal.

In one possible implementation, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

Optionally, the information of the sub-band includes at least one of the following items: a width of the sub-band, or the number of the sub-bands.

Optionally, the overhead of the indication information for the information of the at least one sub-band for the transmission of the uplink signal, includes: the an overhead of the indication information corresponding to each sub-band in the at least one sub-band for the transmission of the uplink signal; and/or the overhead of the indication information for the at least one sub-band for the transmission of the uplink signal.

Optionally, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

In the present embodiment, the specific implementation methods under the different categories of first information may be implemented by referring to the method corresponding to the aforementioned terminal side, which is not repeated here.

According to the communication method provided by the present embodiment, the network device may indicate the information of the sub-band, and/or the number of pieces and/or overhead of the indication information for the information of the sub-band to the terminal. Then the terminal may perform frequency selective precoding transmission on the uplink signal according to the indicated sub-band information or the number of pieces and/or overhead of the indication information for the information of the sub-band, thereby improving the transmission performance of the uplink signal.

Based on the same technical concept, an embodiment of the present disclosure further provides a communication apparatus. Because the communication apparatus is the communication apparatus in the method of the embodiment of the present disclosure, and the principle of the communication apparatus for solving the problem is similar to that of the method, implementation of the communication apparatus may refer to implementation of the method, and the repetitions are omitted.

As shown in FIG. 7, the communication apparatus of the embodiment of the present disclosure includes: a processor 7100, a memory 7101 and a transceiver 7102.

The processor 7100 is responsible for managing a bus architecture and usual processing, and the memory 7101 may store data used by the processor 7100 during operation execution. The transceiver 7102 is configured to receive and send data under control of the processor 7100.

The bus architecture may include any number of interconnected buses and bridges, which are specifically linked together by various circuits of one or more processors 7100 represented by the processor 7100 and a memory represented by the memory 7101. The bus architecture may further link various other circuits such as a peripheral device, a voltage stabilizer and a power management circuit together, which are publicly known in the art and therefore are not further described herein. The bus interface provides an interface. The processor 7100 is responsible for managing the bus architecture and usual processing, and the memory 7101 may store data used by the processor 7100 during operation execution.

A flow disclosed in the embodiment of the present disclosure may be applied to the processor 7100 or be implemented by the processor 7100. In an implementation process, all steps of a signal processing flow may be completed through an integrated logic circuit of hardware in the processor 7100 or in a software form. The processor 7100 may be a general-purpose processor 7100, a digital signal processor 7100, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor 7100 may be a microprocessor 7100 or any conventional processor 7100, etc. The steps of the method disclosed in combination with the embodiment of the present disclosure may be directly embodied as being executed and completed by a hardware processor 7100, or be executed and completed by a hardware and software module combination in the processor 7100. A software module may be located in a random access memory, a flash memory, a read only memory, a programmable read only memory, or an electrically erasable programmable memory, a register and other mature computer readable storage mediums in the art. The computer readable storage medium is located in the memory 7101, and the processor 7100 reads information in the memory 7101, and is combined with its hardware to complete the steps of the signal processing flow.

The processor 7100 is configured to read a program in the memory 7101 and execute: determining information of at least one sub-band in a frequency-domain resource for a transmission of an uplink signal, and/or, a number of pieces and/or overhead of the indication information for the information of the at least one sub-band for the transmission of the uplink signal according to a transmission parameter for the uplink signal and/or parameter information of the frequency-domain resource.

Optionally, the parameter information of the frequency-domain resource includes at least one of the following items: a band width of a BWP corresponding to the uplink signal, a resource range of RA corresponding to the uplink signal, a band width of a component carrier corresponding to the uplink signal, or a band width of a serving cell corresponding to the uplink signal.

Optionally, the transmission parameter includes at least one of the following items: information of an SRS resource, a codebook subset parameter sent by a network side, information of a number of transmission layers, whether the uplink signal is transmitted with full power, or a full-power transmission mode of the uplink signal.

Optionally, the band width of the BWP corresponding to the uplink signal is a band width of a BWP where an uplink signal is transmitted, or a band width of a UL BWP being activated when the uplink signal is scheduled by a network side; or a maximum value of band widths of all UL BWPs configured by a network side for a carrier where the uplink signal is transmitted.

Optionally, the band width of the component carrier corresponding to the uplink signal includes a band width of a component carrier where the uplink signal is transmitted; or the band width of the component carrier corresponding to the uplink signal is a band width of an uplink component carrier being activated when the uplink signal is scheduled by a network side; or the band width of the component carrier corresponding to the uplink signal is a maximum value of band widths of all uplink component carriers in a component carrier aggregation configured by a network side for the transmission of the uplink signal.

Optionally, the information of the uplink SRS resource includes a number of antenna ports of an SRS resource in an SRS resource set with a usage which is consistent with a transmission mode of PUSCH, and/or a number of antenna ports of an SRS resource in an SRS resource set indicated by the network side, and/or a number of antenna ports of an SRS resource indicated by the network side.

Optionally, the processor 7100 is configured to determine indication information for the information of the at least one sub-band for transmission of the uplink signal according to a maximum number of antenna ports of at least one SRS resource in the SRS resource set with a usage which is consistent with an transmission mode of the uplink signal; or determine the indication information for the information of the at least one sub-band for transmission of the uplink signal according to a maximum number of the antenna ports of at least one SRS resource in the SRS resource set indicated by the network side; or determine the indication information for the information of the at least one sub-band for the transmission of the uplink signal according to a number of the antenna ports of the SRS resource indicated by the network side; wherein each SRS resource set includes at least one SRS resource.

Optionally, the information of the number of transmission layers includes: a maximum number of transmission layers for the transmission of the uplink signal.

Optionally, the maximum number of transmission layers for the transmission of the uplink signal includes: a maximum number of transmission layers corresponding to a transmission mode of the uplink signal supported by a terminal; or a maximum number of transmission layers corresponding to a transmission mode of the uplink signal configured by the network side for a terminal; or a smaller value of a number of transmission layers corresponding to a transmission mode of the uplink signal supported by a terminal and a maximum number of transmission layers corresponding to a transmission mode of the uplink signal configured by the network side for a terminal; or a minimum value among a number of antenna ports of an SRS resource corresponding to a transmission mode of the uplink signal, a maximum number of transmission layers corresponding to a transmission mode of the uplink signal supported by a terminal and a maximum number of transmission layers corresponding to a transmission mode of the uplink signal configured by the network side for the terminal; or a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal; or a smaller value of a number of antenna ports of an SRS resource under a transmission mode of the uplink signal and a maximum number of transmission layers corresponding to a transmission mode of the uplink signal supported by a terminal; or a smaller value of a number of antenna ports of an SRS resource indicated by the network side and a maximum number of transmission layers corresponding to a transmission mode of the uplink signal supported by a terminal; or a smaller value of a number of antenna ports of an SRS resource under a transmission mode of the uplink signal and a maximum number of transmission layers corresponding to a transmission mode of the uplink signal configured by the network side for a terminal; or a smaller value of a number of antenna ports of an SRS resource indicated by the network side and a maximum number of transmission layers corresponding to a transmission mode of the uplink signal configured by the network side for a terminal.

Optionally, the transceiver 7102 is configured to obtain the transmission parameter for the transmission of the uplink signal and/or the parameter information of the frequency-domain resource for the uplink signal.

Optionally, the processor 7100 is configured to determine the information of the at least one sub-band in the frequency-domain resource according to the transmission parameter and/or the parameter information of the frequency-domain resource and a first corresponding relationship between the transmission parameter and/or the parameter information of the frequency-domain resource and the information of the at least one sub-band, wherein the first corresponding information is indicated by the network side through a signaling or is pre-determined by the terminal and the network side.

Optionally, the processor 7100 is configured to determine the number of pieces and/or overhead of the indication information for the information of the at least one sub-band for the transmission of the uplink signal according to the transmission parameter and/or the parameter information of the frequency-domain resource and a second corresponding relationship between the transmission parameter and/or the parameter information of the frequency-domain resource and the overhead of the indication information for the information of the at least one sub-band.

The second corresponding relationship is indicated by the network side through a signaling or is pre-determined by the terminal and the network side.

Optionally, the information of sub-band includes one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band.

Optionally, the processor 7100 is configured to determine an overhead of the indication information corresponding to each sub-band in the at least one sub-band for the transmission of the uplink signal; and/or determine an overhead of the indication information for the at least one sub-band for the transmission of the uplink signal.

Optionally, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

Optionally, a number of the sub-bands and a number of the transmission precoding matrix indicators of the sub-bands are the same.

Based on the same inventive concept, an embodiment of the present disclosure further provides another communication apparatus. Because the apparatus is the apparatus in the method of the embodiment of the present disclosure, and the principle of the apparatus for solving the problem is similar to that of the method, implementation of the apparatus may refer to implementation of the method, and the repetitions are omitted.

As shown in FIG. 8A, an embodiment of the present disclosure further provides a communication apparatus, including: a determining module 801, configured to determine information of at least one sub-band in a frequency-domain resource for a transmission of an uplink signal, and/or, a number of pieces of and/or overhead of indication information for the information of the at least one sub-band for the transmission of the uplink signal according to a transmission parameter for the uplink signal and/or parameter information of the frequency-domain resource.

Optionally, in the determining module 801, the parameter information of the frequency-domain resource includes at least one of the following items: a band width of a BWP corresponding to the uplink signal, a resource range of RA corresponding to the uplink signal, a band width of a component carrier corresponding to the uplink signal, or a band width of a serving cell corresponding to the uplink signal.

Optionally, in the determining module 801, the transmission parameter includes at least one of the following items: information of an SRS resource, a codebook subset parameter sent by a network side, information of a number of transmission layers, whether the uplink signal is transmitted with full power, or a full-power transmission mode of the uplink signal.

Optionally, in the determining module 801, the band width of the BWP corresponding to the uplink signal is a band width of a BWP where the uplink signal is transmitted, or a band width of a UL BWP being activated when the uplink signal is scheduled by a network side; or a maximum value of band widths of all UL BWPs configured by a network side for a carrier where the uplink signal is transmitted.

Optionally, in the determining module 801, the band width of the component carrier corresponding to the uplink signal includes a band width of a component carrier where the uplink signal is transmitted; or the band width of the component carrier corresponding to the uplink signal is a band width of an uplink component carrier being activated when the uplink signal is scheduled by a network side; or the band width of the component carrier corresponding to the uplink signal is a maximum value of band widths of all uplink component carriers in a component carrier aggregation configured by a network side for the transmission of the uplink signal.

Optionally, in the determining module 801, the information of the SRS resource includes a number of antenna ports of an SRS resource in an SRS resource set with a usage which is consistent with a transmission mode of PUSCH, and/or a number of antenna ports of an SRS resource in an SRS resource set indicated by the network side, and/or a number of antenna ports of an SRS resource indicated by the network side.

Optionally, the determining module 801 is configured to determine indication information for the information of the at least one sub-band for the transmission of the uplink signal according to a maximum number of antenna ports of at least one SRS resource in the SRS resource set with a usage which is consistent with an transmission mode of the uplink signal; or determine the indication information for the information of the at least one sub-band for the transmission of the uplink signal according to a maximum number of the antenna ports of at least one SRS resource in the SRS resource set indicated by the network side; or determine the indication information for the information of the at least one sub-band for the transmission of the uplink signal according to a number of the antenna ports of the SRS resource indicated by the network side.

Optionally, in the determining module 801, the information of the number of transmission layers includes: a maximum number of transmission layers for the transmission of the uplink signal.

Optionally, in the determining module 801, the maximum number of transmission layers for the transmission of the uplink signal includes: a maximum number of transmission layers corresponding to a transmission mode of the uplink signal supported by a terminal; or a maximum number of transmission layers corresponding to a transmission mode of the uplink signal configured by the network side for a terminal; or a smaller value of a number of transmission layers corresponding to a transmission mode of the uplink signal supported by a terminal and a maximum number of transmission layers corresponding to a transmission mode of the uplink signal configured by the network side for a terminal; or a minimum value among a number of antenna ports of an SRS resource corresponding to a transmission mode of the uplink signal, a maximum number of transmission layers corresponding to a transmission mode of the uplink signal supported by a terminal and a maximum number of transmission layers corresponding to a transmission mode of the uplink signal configured by the network side for the terminal; or a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal; or a smaller value of a number of antenna ports of an SRS resource under a transmission mode of the uplink signal and a maximum number of transmission layers corresponding to a transmission mode of the uplink signal supported by a terminal; or a smaller value of a number of antenna ports of an SRS resource indicated by the network side and a maximum number of transmission layers corresponding to a transmission mode of the uplink signal supported by a terminal; or a smaller value of a number of antenna ports of an SRS resource under a transmission mode of the uplink signal and a maximum number of transmission layers corresponding to a transmission mode of the uplink signal configured by the network side for a terminal; or a smaller value of a number of antenna ports of an SRS resource indicated by the network side and a maximum number of transmission layers corresponding to a transmission mode of the uplink signal configured by the network side for a terminal.

Optionally, the apparatus further includes an obtaining module 802, as shown in FIG. 8B. The obtaining module 802 is configured to obtain the transmission parameter for the transmission of the uplink signal and/or the parameter information of the frequency-domain resource for the uplink signal.

Optionally, the determining module 801 is configured to determine the information of the at least one sub-band in the frequency-domain resource according to the transmission parameter and/or the parameter information of the frequency-domain resource and a first corresponding relationship between the transmission parameter and/or the parameter information of the frequency-domain resource and the information of the at least one sub-band, wherein the first corresponding relationship is indicated by the network side through a signaling or is pre-determined by the terminal and the network side.

Optionally, the determining module 801 is configured to determine the number of pieces and/or overhead of the indication information for the information of the at least one sub-band for the transmission of the uplink signal according to the transmission parameter and/or the parameter information of the frequency-domain resource and a second corresponding relationship between the transmission parameter and/or the parameter information of the frequency-domain resource and the overhead of the indication information for the information of the at least one sub-band.

The second corresponding relationship is indicated by the network side through a signaling or is pre-determined by the terminal and the network side.

Optionally, in the determining module 801, the information of sub-band includes one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band.

Optionally, the determining module 801 is configured to determine an overhead of the indication information corresponding to each sub-band in the at least one sub-band for the transmission of the uplink signal; and/or determine an overhead of the indication information for the at least one sub-band for the transmission of the uplink signal.

Optionally, in the determining module 801, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

Optionally, in the determining module 801, a number of the sub-bands and a number of transmission precoding matrix indicators of the sub-band are the same.

Based on the same inventive concept, an embodiment of the present disclosure further provides another communication apparatus. Because the apparatus is the apparatus in the method of the embodiment of the present disclosure, and the principle of the apparatus for solving the problem is similar to that of the method, implementation of the apparatus may refer to implementation of the method, and the repetitions are omitted.

Figure 9:
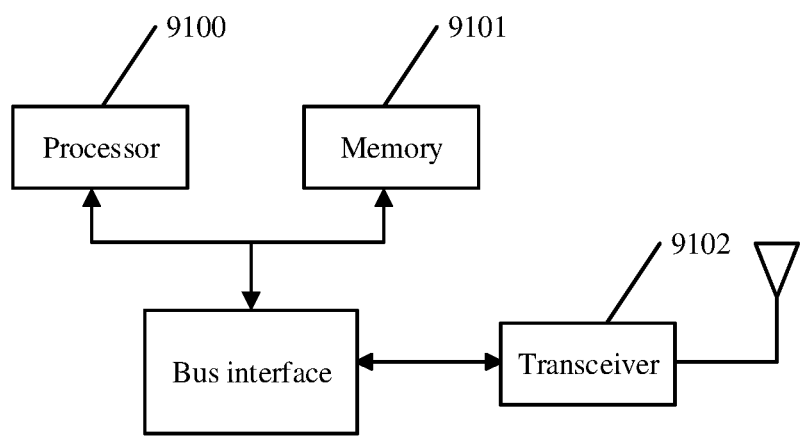
FIG. 9 is a schematic diagram of a communication apparatus in an embodiment of the present disclosure.

As shown in FIG. 9, the apparatus includes: a processor 9100, a memory 9101 and a transceiver 9102.

The processor 9100 is responsible for managing a bus architecture and usual processing, and the memory 9101 may store data used by the processor 9100 during operation execution. The transceiver 9102 is configured to receive and send data under control of the processor 9100.

The bus architecture may include any number of interconnected buses and bridges, which are specifically linked together by various circuits of one or more processors 9100 represented by the processor 9100 and a memory represented by the memory 9101. The bus architecture may further link various other circuits such as a peripheral device, a voltage stabilizer and a power management circuit together, which are publicly known in the art and therefore are not further described herein. The bus interface provides an interface. The processor 9100 is responsible for managing the bus architecture and usual processing, and the memory 9101 may store data used by the processor 9100 during operation execution.

A flow disclosed in the embodiment of the disclosure may be applied to the processor 9100 or be implemented by the processor 9100. In an implementation process, all steps of a signal processing flow may be completed through an integrated logic circuit of hardware in the processor 9100 or in a software form. The processor 9100 may be a general-purpose processor 9100, a digital signal processor 9100, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor 9100 may be a microprocessor 9100 or any conventional processor 9100, etc. The steps of the method disclosed in combination with the embodiment of the present disclosure may be directly embodied as being executed and completed by a hardware processor 9100, or be executed and completed by a hardware and software module combination in the processor 9100. A software module may be located in a random access memory, a flash memory, a read only memory, a programmable read only memory, or an electrically erasable programmable memory, a register and other mature computer readable storage mediums in the art. The computer readable storage medium is located in the memory 9101, and the processor 9100 reads information in the memory 9101, and is combined with its hardware to complete the steps of the signal processing flow.

The processor 9100 is configured to read a program in the memory 9101 and execute the following processes: obtaining first information by a terminal, wherein the first information is configured to indicate information of at least one sub-band in a frequency-domain resource for a transmission of an uplink signal of the terminal, and/or, configured to indicate an overhead and/or number of pieces of indication information for the information of the at least one sub-band for the transmission of the uplink signal sent by a network side.

Optionally, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

Optionally, the information of the sub-band includes at least one of the following items: a width of the sub-band, or the number of the sub-bands.

Optionally, the overhead of the indication information for the information of the at least one sub-band for the transmission of the uplink signal, includes: an overhead of the indication information corresponding to each sub-band in the at least one sub-band for the transmission of the uplink signal; and/or an overhead of the indication information for the at least one sub-band for the transmission of the uplink signal.

Optionally, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

Based on the same inventive concept, an embodiment of the present disclosure further provides another communication apparatus. Because the apparatus is the apparatus in the method of the embodiment of the present disclosure, and the principle of the apparatus for solving the problem is similar to that of the method, implementation of the apparatus may refer to implementation of the method, and the repetitions are omitted.

Figure 10:
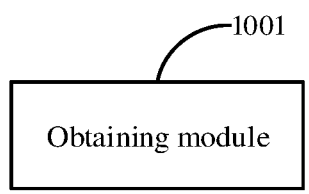
FIG. 10 is a schematic diagram of a communication apparatus in an embodiment of the present disclosure.

As shown in FIG. 10, an embodiment of the present disclosure further provides a communication apparatus, including: an obtaining module 1001, configured to obtain first information, wherein the first information is configured to indicate information of at least one sub-band in a frequency-domain resource for a transmission of an uplink signal of a terminal, and/or, configured to indicate an overhead and/or number of pieces of indication information for the information of the at least one sub-band for the transmission of the uplink signal sent by a network side.

Optionally, in the obtaining module 1001, the first information includes at least one of the following items: configuration and/or indication information of a BWP corresponding to the uplink signal, configuration and/or indication information of RA corresponding to the uplink signal, and configuration and/or indication information of a component carrier corresponding to the uplink signal.

Optionally, in the obtaining module 1001, the information of the sub-band includes at least one of the following items: a width of the sub-band, or the number of the sub-bands.

Optionally, in the obtaining module 1001, the overhead of the indication information for the information of the at least one sub-band for the transmission of the uplink signal, includes: an overhead of the indication information corresponding to each sub-band in the at least one sub-band for the transmission of the uplink signal; and/or determining an overhead of the indication information for the at least one sub-band for the transmission of the uplink signal.

Optionally, in the obtaining module 1001, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

Based on the same inventive concept, an embodiment of the present disclosure further provides another communication apparatus. Because the apparatus is the apparatus in the method of the embodiment of the present disclosure, and the principle of the apparatus for solving the problem is similar to that of the method, implementation of the apparatus may refer to implementation of the method, and the repetitions are omitted.

Figure 11:
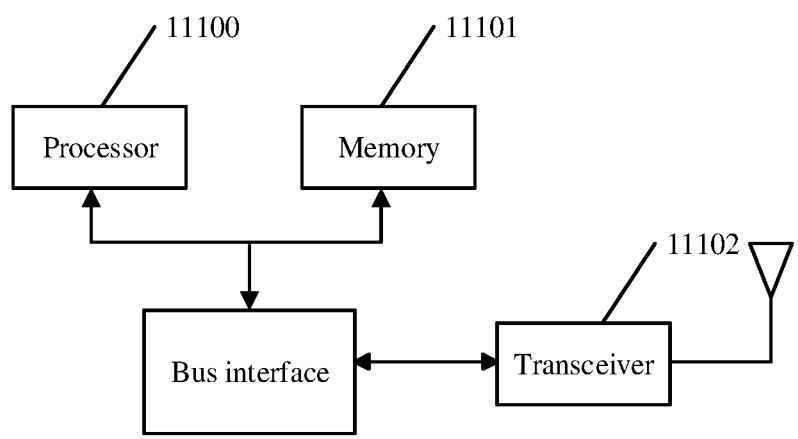
FIG. 11 is a schematic diagram of a communication apparatus in an embodiment of the present disclosure.

As shown in FIG. 11, the apparatus includes: a processor 11100, a memory 11101 and a transceiver 11102.

The processor 11100 is responsible for managing a bus architecture and usual processing, and the memory 11101 may store data used by the processor 11100 during operation execution. The transceiver 11102 is configured to receive and send data under control of the processor 11100.

The bus architecture may include any number of interconnected buses and bridges, which are specifically linked together by various circuits of one or more processors 11100 represented by the processor 11100 and a memory represented by the memory 11101. The bus architecture may further link various other circuits such as a peripheral device, a voltage stabilizer and a power management circuit together, which are publicly known in the art and therefore are not further described herein. The bus interface provides an interface. The processor 11100 is responsible for managing the bus architecture and usual processing, and the memory 11101 may store data used by the processor 11100 during operation execution.

A flow disclosed in the embodiment of the disclosure may be applied to the processor 11100 or be implemented by the processor 11100. In an implementation process, all steps of a signal processing flow may be completed through an integrated logic circuit of hardware in the processor 11100 or in a software form. The processor 11100 may be a general-purpose processor 11100, a digital signal processor 11100, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor 11100 may be a microprocessor 11100 or any conventional processor 11100, etc. The steps of the method disclosed in combination with the embodiment of the present disclosure may be directly embodied as being executed and completed by a hardware processor 11100, or be executed and completed by a hardware and software module combination in the processor 11100. A software module may be located in a random access memory, a flash memory, a read only memory, a programmable read only memory, or an electrically erasable programmable memory, a register and other mature computer readable storage mediums in the art. The computer readable storage medium is located in the memory 11101, and the processor 11100 reads information in the memory 11101, and is combined with its hardware to complete the steps of the signal processing flow.

The processor 11100 is configured to read a program in the memory 11101 and execute the following processes: sending first information by a network device, wherein the first information is configured to indicate information of at least one sub-band in an uplink frequency-domain resource of a terminal, and/or, configured to indicate an overhead and/or number of pieces of indication information for the information of the at least one sub-band for a transmission of an uplink signal of the terminal.

Optionally, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

Optionally, the information of the sub-band includes at least one of the following items: a width of the sub-band, or the number of the sub-bands.

Optionally, the overhead of the indication information for the information of the at least one sub-band for the transmission of the uplink signal, includes: the an overhead of the indication information corresponding to each sub-band in the at least one sub-band for the transmission of the uplink signal; and/or an overhead of the indication information for the at least one sub-band for the transmission of the uplink signal.

Optionally, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

Based on the same inventive concept, an embodiment of the present disclosure further provides another communication apparatus. Because the apparatus is the apparatus in the method of the embodiment of the present disclosure, and the principle of the apparatus for solving the problem is similar to that of the method, implementation of the apparatus may refer to implementation of the method, and the repetitions are omitted.

Figure 12:
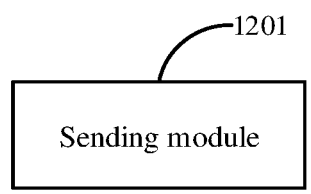
FIG. 12 is a schematic diagram of a communication apparatus in an embodiment of the present disclosure.

As shown in FIG. 12, an embodiment of the present disclosure further provides a communication apparatus, including: a sending module 1201, configured to send first information, wherein the first information is configured to indicate information of at least one sub-band in an uplink frequency-domain resource of a terminal, and/or, configured to indicate an overhead and/or number of pieces of indication information for the information of the at least one sub-band for a transmission of an uplink signal of the terminal.

Optionally, in the sending module 1201, the first information includes at least one of the following items: a configuration and/or indication information of a BWP corresponding to the uplink signal, a configuration and/or indication information of RA corresponding to the uplink signal, and a configuration and/or indication information of a component carrier corresponding to the uplink signal.

Optionally, in the sending module 1201, the information of the sub-band includes at least one of the following items: a width of the sub-band, or the number of the sub-bands.

Optionally, in the sending module 1201, the overhead of the indication information for the information of the at least one sub-band for the transmission of the uplink signal, includes: an overhead of the indication information corresponding to each sub-band in the at least one sub-band for the transmission of the uplink signal; and/or an overhead of the indication information for the at least one sub-band for the transmission of the uplink signal.

Optionally, in the sending module 1201, the indication information includes at least one of the following items: a transmission precoding matrix indicator, indication information for a number of transmission layers, indication information for spatial related information, a sounding reference signal resource indicator, indication information for a transmission antenna or indication information for an antenna panel.

An embodiment of the present disclosure further provides a computer readable nonvolatile storage medium, including a program code. When the program code is run on a computing terminal, the program code is configured to enable the computing terminal to execute the steps of the above communication method of the embodiment of the present disclosure.

The above reference shows that the present disclosure is described according to a block diagram and/or flow diagram of the method, the apparatus (system) and/or the computer program product of the embodiment of the present disclosure. It should be understood that one block of block diagrams and/or flow diagrams and a combination of the blocks of the block diagrams and/or the flow diagrams may be implemented through a computer program instruction. These computer program instructions may be provided to a processor of a general-purpose computer, a special-purpose computer, and/or other programmable data processing apparatuses to generate a machine, such that the instructions, when executed by the processor of the computers or other programmable data processing apparatuses, create a method for implementing functions/motions specified in the blocks of the block diagrams and/or the flow diagrams.

Accordingly, the present disclosure may further be implemented through hardware and/or software (including firmware, resident software, a microcode, etc.) Further, the present disclosure may adopt a form of a computer program product on a computer available or computer readable storage medium, which has a computer available or computer readable program code implemented in the medium, so as to be used by an instruction execution system or be used in combination with the instruction execution system. In the context of the present disclosure, the computer available or computer readable medium may be any medium, which may contain, store, communicate, transmit or transfer the program, so as to be used by the instruction execution system, apparatus or device, or be used in combination with the instruction execution system, apparatus or device.

Obviously, those skilled in the art can make various modifications and variations to the present disclosure without departing from the spirit and scope of the present disclosure. In this way, if these modifications and variations of the present disclosure fall within the scope of the claims of the present disclosure and their equivalent art, the present disclosure also intends to include these modifications and variations.

What is claimed is:

1. A communication method, comprising:
   according to a transmission parameter and/or parameter information of a frequency-domain resource for a transmission of an uplink signal and a first corresponding relationship of the transmission parameter and/or the parameter information of the frequency-domain resource with the information of at least one sub-band, determining an overhead of indication information corresponding to each sub-band in the at least one sub-band for the transmission of the uplink signal, or determining an overhead of indication information for the at least one sub-band for the transmission of the uplink signal;
   wherein the information of the at least one sub-band comprises one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band;
   the indication information comprises at least one of the following: a transmission precoding matrix indicator, indication information for a number of transmission layers, indication information for spatial related information, a sounding reference signal resource indicator, indication information for a transmission antenna or indication information for an antenna panel; and
   a number of sub-bands and a number of transmission precoding matrix indicators of the sub-bands are the same.

2. The method according to claim 1, wherein the parameter information of the frequency-domain resource comprises at least one of the following items:
   a band width of a bandwidth part (BWP) corresponding to the uplink signal, a resource range of frequency-domain resource allocation (RA) corresponding to the uplink signal, a band width of a component carrier (CC) corresponding to the uplink signal, or a band width of a serving cell corresponding to the uplink signal.

3. The method according to claim 2, wherein the band width of the BWP corresponding to the uplink signal is:
   a band width of a BWP where the uplink signal is transmitted; or
   a band width of an uplink (UL) BWP being activated in a condition that the uplink signal is scheduled by a network side; or
   a maximum value of band widths of all UL BWPs configured by a network side for a carrier where the uplink signal is transmitted.

4. The method according to claim 2, wherein:
   the band width of the component carrier corresponding to the uplink signal comprises a band width of a component carrier where the uplink signal is transmitted; or
   the band width of the component carrier corresponding to the uplink signal is a band width of an uplink component carrier being activated in a condition that the uplink signal is scheduled by a network side; or
   the band width of the component carrier corresponding to the uplink signal is a maximum value of band widths of all uplink component carriers in a component carrier aggregation configured by a network side for the transmission of the uplink signal.

5. The method according to claim 1, wherein the transmission parameter comprises at least one of the following items:
   information of an uplink sounding reference signal (SRS) resource, a codebook subset parameter sent by a network side, information of a number of transmission layers, whether the uplink signal is transmitted with full power, or a full-power transmission mode of the uplink signal.

6. The method according to claim 5, wherein the information of the SRS resource comprises:
   a number of antenna ports of an SRS resource in an SRS resource set with a usage which is consistent with a transmission mode of physical uplink shared channel (PUSCH), and/or
   a number of antenna ports of an SRS resource in an SRS resource set indicated by the network side, and/or
   a number of antenna ports of an SRS resource indicated by the network side.

7. The method according to claim 6, wherein the parameter information of the frequency-domain resource, comprises:
   a maximum number of antenna ports of at least one SRS resource in the SRS resource set with a usage which is consistent with an transmission mode of the uplink signal; or a maximum number of the antenna ports of at least one SRS resource in the SRS resource set indicated by the network side; or a number of the antenna ports of the SRS resource indicated by the network side;

wherein each SRS resource set comprises at least one SRS resource.

8. The method according to claim 5, wherein the information of the number of transmission layers comprises:

a maximum number of transmission layers for the transmission of the uplink signal.

9. The method according to claim 8, wherein the maximum number of transmission layers for the transmission of the uplink signal comprises:

a maximum number of transmission layers corresponding to a transmission mode of the uplink signal supported by a terminal; or a maximum number of transmission layers corresponding to a transmission mode of the uplink signal configured by the network side for a terminal; or a smaller value of a number of transmission layers corresponding to a transmission mode of the uplink signal supported by a terminal and a maximum number of transmission layers corresponding to a transmission mode of the uplink signal configured by the network side for a terminal; or a minimum value among a number of antenna ports of an SRS resource corresponding to a transmission mode of the uplink signal, a maximum number of transmission layers corresponding to a transmission mode of the uplink signal supported by a terminal and a maximum number of transmission layers corresponding to a transmission mode of the uplink signal configured by the network side for the terminal; or a minimum value among a number of antenna ports of an SRS resource indicated by the network side, a maximum number of transmission layers corresponding to a transmission mode of the uplink signal supported by a terminal and a maximum number of transmission layers corresponding to a transmission mode of the uplink signal configured by the network side for the terminal; or a smaller value of a number of antenna ports of an SRS resource under a transmission mode of the uplink signal and a maximum number of transmission layers corresponding to a transmission mode of the uplink signal supported by a terminal; or a smaller value of a number of antenna ports of an SRS resource indicated by the network side and a maximum number of transmission layers corresponding to a transmission mode of the uplink signal supported by a terminal; or a smaller value of a number of antenna ports of an SRS resource under a transmission mode of the uplink signal and a maximum number of transmission layers corresponding to a transmission mode of the uplink signal configured by the network side for a terminal; or a smaller value of a number of antenna ports of an SRS resource indicated by the network side and a maximum number of transmission layers corresponding to a transmission mode of the uplink signal configured by the network side for a terminal.

10. The method according to claim 1, wherein before the determining the overhead of indication information corresponding to each sub-band in the at least one sub-band for the transmission of the uplink signal, and/or determining the overhead of indication information for the at least one sub-band for the transmission of the uplink signal, the method comprises:

obtaining the parameter information of the frequency-domain resource for the transmission of the uplink signal and/or the transmission parameter for the uplink signal.

11. The method according to claim 1, wherein the first corresponding relationship is indicated by the network side through a signaling or is pre-determined by the terminal and the network side.

12. A computer readable storage medium, storing a computer program or instruction, wherein the computer program or instruction, when executed, causes a processor to execute the method according to claim 1.

13. A communication apparatus, comprising:

a memory, configured to store an executable instruction; and a processor, configured to execute the executable instruction stored in the memory to execute the following process:

according to a transmission parameter and/or parameter information of a frequency-domain resource for a transmission of an uplink signal and a first corresponding relationship of the transmission parameter and/or the parameter information of the frequency-domain resource with the information of at least one sub-band, determining an overhead of indication information corresponding to each sub-band in the at least one sub-band for the transmission of the uplink signal, and/or determining an overhead of indication information for the at least one sub-band for the transmission of the uplink signal;

wherein the information of the at least one sub-band comprises one or more of the following items: a width of a sub-band, a number of sub-bands, a transmission precoding matrix of a sub-band, a number of transmission layers of a sub-band, spatial related information of a sub-band, an SRS resource of a sub-band, a transmission antenna of a sub-band, or an antenna panel of the sub-band;

the indication information comprises at least one of the following: a transmission precoding matrix indicator, indication information for a number of transmission layers, indication information for spatial related information, a sounding reference signal resource indicator, indication information for a transmission antenna or indication information for an antenna panel; and a number of sub-bands and a number of transmission precoding matrix indicators of the sub-bands are the same.

14. The apparatus according to claim 13, wherein before the determining the overhead of indication information corresponding to each sub-band in the at least one sub-band for the transmission of the uplink signal, and/or determining an overhead of indication information for the at least one sub-band for the transmission of the uplink signal, the processor is configured for:

obtaining the parameter information of the frequency-domain resource for the transmission of the uplink signal and/or the transmission parameter for the uplink signal.

15. The apparatus according to claim 13, wherein the first corresponding relationship is indicated by the network side through a signaling or is pre-determined by the terminal and the network side.

16. The apparatus according to claim 13, wherein the parameter information of the frequency-domain resource comprises at least one of the following items:
- a band width of a bandwidth part (BWP) corresponding to the uplink signal, a resource range of resource allocation (RA) corresponding to the uplink signal, a band width of a component carrier (CC) corresponding to the uplink signal, or a band width of a serving cell corresponding to the uplink signal.

17. The apparatus according to claim 16, wherein the band width of the BWP corresponding to the uplink signal is:
- a band width of a BWP where the uplink signal is transmitted; or
- a band width of a UL BWP being activated in a condition that the uplink signal is scheduled by a network side; or
- a maximum value of band widths of all UL BWPs configured by a network side for a carrier where the uplink signal is transmitted.

18. The apparatus according to claim 16, wherein:
- the band width of the component carrier corresponding to the uplink signal comprises a band width of a component carrier where the uplink signal is transmitted; or
- the band width of the component carrier corresponding to the uplink signal is a band width of an uplink component carrier being activated in a condition that the uplink signal is scheduled by a network side; or
- the band width of the component carrier corresponding to the uplink signal is a maximum value of band widths of all uplink component carriers in a component carrier aggregation configured by a network side for the transmission of the uplink signal.

19. The apparatus according to claim 13, wherein the transmission parameter comprises at least one of the following items:
- information of a sounding reference signal (SRS) resource, a codebook subset parameter sent by a network side, information of a number of transmission layers, whether the uplink signal is transmitted with full power, or a full-power transmission mode of the uplink signal.

20. The apparatus according to claim 19, wherein the SRS resource information comprises:
- a number of antenna ports of an SRS resource in an SRS resource set with a usage which is consistent with a transmission mode of physical uplink shared channel (PUSCH), and/or
- a number of antenna ports of an SRS resource in an SRS resource set indicated by the network side, and/or
- a number of antenna ports of an SRS resource indicated by the network side.

* * * * *